US008359148B2

(12) United States Patent
Inoue et al.

(10) Patent No.: US 8,359,148 B2
(45) Date of Patent: Jan. 22, 2013

(54) RUNNING ROAD DETERMINATION DEVICE, VEHICLE RUNNING CONTROL APPARATUS AND VEHICLE RUNNING CONTROL METHOD

(75) Inventors: Gen Inoue, Susono (JP); Yasuhito Ishida, Toyokawa (JP)

(73) Assignees: Toyota Jidosha Kabushiki Kaisha, Toyota (JP); Advics Co., Ltd., Kariya (JP)

( * ) Notice: Subject to any disclaimer, the term of this patent is extended or adjusted under 35 U.S.C. 154(b) by 765 days.

(21) Appl. No.: 12/230,851

(22) Filed: Sep. 5, 2008

(65) Prior Publication Data

US 2009/0069993 A1 Mar. 12, 2009

(30) Foreign Application Priority Data

Sep. 6, 2007 (JP) .................... 2007-232074

(51) Int. Cl.
G06F 19/00 (2006.01)
G06G 7/76 (2006.01)
(52) U.S. Cl. .......................... 701/78; 188/156
(58) Field of Classification Search .............. 701/34, 701/65, 29, 70, 78; 73/146, 146.2; 340/445; 188/156
See application file for complete search history.

(56) References Cited

U.S. PATENT DOCUMENTS

| 6,142,026 A * | 11/2000 | Ohashi et al. ........... 73/865.9 |
| 6,377,885 B2 * | 4/2002 | Yasui et al. ............... 701/80 |
| 6,402,259 B2 * | 6/2002 | Corio et al. .............. 303/20 |
| 6,954,692 B2 * | 10/2005 | Dellac et al. ............ 701/70 |
| 2005/0235744 A1 * | 10/2005 | Ogawa ................. 73/146 |
| 2006/0129291 A1 * | 6/2006 | Lu et al. ............... 701/36 |
| 2007/0106442 A1 * | 5/2007 | Lu ....................... 701/38 |

FOREIGN PATENT DOCUMENTS

| JP | A-3-148314 | 6/1991 |
| JP | A-4-365612 | 12/1992 |
| JP | A-8-207619 | 8/1996 |
| JP | B-2785051 | 8/1998 |
| JP | A-2000-203303 | 7/2000 |
| JP | A-2001-30794 | 2/2001 |
| JP | A-2004-90679 | 3/2004 |
| JP | A-2006-2806 | 1/2006 |
| JP | A-2007-191073 | 8/2007 |
| JP | A-2009-12611 | 1/2009 |

OTHER PUBLICATIONS

Mar. 9, 2012 Office Action issued in Japanese Patent Application No. 2007-232074 (with partial English translation).

* cited by examiner

Primary Examiner — Ronnie Mancho
(74) Attorney, Agent, or Firm — Oliff & Berridge, PLC

(57) ABSTRACT

A vehicle running control apparatus, which performs automatic running control by controlling an engine for applying a driving torque to a vehicle C and a brake device for applying a braking torque to the vehicle C such that a vehicle speed of the vehicle C becomes equal to a preset target vehicle speed, determines, on the basis of a target driving torque ETo calculated to apply the driving torque to the vehicle C and a target braking torque BTo calculated to apply the braking torque to the vehicle C, whether or not the vehicle C is running on a road difficult to run on, when automatic running control is performed. When it is determined that the vehicle C is running on the road difficult to run on, automatic running control is terminated.

17 Claims, 15 Drawing Sheets

RUNNING ROAD DETERMINATION DEVICE, VEHICLE RUNNING CONTROL APPARATUS AND VEHICLE RUNNING CONTROL METHOD

INCORPORATION BY REFERENCE

The disclosure of Japanese Patent Application No. 2007-232074 filed on Sep. 6, 2007 including the specification, drawings and abstract is incorporated herein by reference in its entirety.

BACKGROUND OF THE INVENTION

1. Field of the Invention

The invention relates to a running road determination device and a vehicle running control apparatus and control method equipped with the running road determination device, and more particularly, to a running road determination device for determining whether or not a vehicle is running on a road difficult to run on, and a vehicle running control apparatus equipped with the running road determination device.

2. Description of the Related Art

A vehicle is mounted with a vehicle running control apparatus that performs automatic running control, such as constant-speed running control as constant vehicle speed control to make the vehicle speed of the vehicle equal to a target vehicle speed, follow-up running control as vehicle speed control to cause the own vehicle to run while following a preceding vehicle, namely, adaptive cruise control (ACC), and the like. In the vehicle running control apparatus, an engine for applying a driving torque to the vehicle and a brake device for applying a braking torque to the vehicle are cooperatively controlled such that the vehicle speed becomes equal to the target vehicle speed. In the vehicle running control apparatus, an automatic running control ECU calculates a target driving torque such that the vehicle speed of the vehicle becomes equal to the target vehicle speed, the calculated target driving torque is output to an engine ECU; and the engine ECU controls the engine as a braking/driving torque generating device on the basis of the target driving torque. Further, in the vehicle running control apparatus, the automatic running control ECU calculates a target braking torque as a target control torque such that the vehicle speed of the vehicle becomes equal to the target vehicle speed, the calculated target braking torque is output to a brake ECU, and the brake ECU controls the brake device as a braking/driving torque generating device on the basis of the target braking torque.

In recent years, some vehicle running control apparatuses perform automatic running control at a low target speed, for example, about 10 km/h. For example, as disclosed in Japanese Patent Application Publication No. 2004-90679 (JP-A-2004-90679), there is a vehicle running control apparatus that performs automatic running control at a target speed approximately equal to a creep speed.

It should be noted herein that roads on which a vehicle runs are classified into on-roads and off-roads. The off-roads are classified into roads relatively easy for the vehicle to run on and roads relatively difficult for the vehicle to run on, depending on the conditions of the roads. Even in the case where automatic running control is performed on a load difficult for the vehicle to run on, the vehicle running control apparatus controls the braking/driving torque generating devices to maintain the target vehicle speed. For example, in the case where the road is composed of rocks insurmountable by tires fitted to the vehicle, the case where the road is a muddy road with a low coefficient of friction, the case where the vehicle is in contact with an obstacle, or the like, the vehicle has difficulty in moving forward. In such a case, when the braking/driving torque generating devices are controlled to increase the driving torque applied to the vehicle, there is a problem in that an excessive load is applied to the braking/driving torque generating devices or the vehicle. It is therefore desirable to reliably determine whether or not the vehicle is running on a road difficult to run on.

The invention provides a running road determination device capable of reliably making a determination on a road on which a vehicle is running, and a vehicle running control apparatus capable of restraining an excessive load from being applied to braking/driving torque generating devices or a vehicle.

SUMMARY OF THE INVENTION

A first aspect of the invention relates to a running road determination device equipped with condition determination means for determining whether or not a running road determination condition is fulfilled, and running road determination means for determining, on the basis of at least one of a driving torque applied to a vehicle and a braking torque applied to the vehicle, whether or not the vehicle is running on a road difficult to run on.

The above-mentioned running road determination device may further be equipped with weighting means for setting weighted values for the driving torque and the braking torque in accordance with a running situation of the vehicle, and the running road determination means may determine, in accordance with a sum of the weighted driving torque and the weighted braking torque, that the vehicle is running on a road difficult to run on.

A second aspect of the invention relates to a vehicle running control apparatus for performing automatic running control by controlling a braking/driving torque generating device, which applies at least one of a driving torque and a braking torque to the vehicle, such that a vehicle speed of the vehicle becomes equal to a preset target vehicle speed. This vehicle running control apparatus is equipped with the running road determination device, and terminates automatic running control when the running road determination means determines that the vehicle is running on the road difficult to run on.

A third aspect of the invention relates to a vehicle running control apparatus for performing automatic running control by controlling a braking/driving torque generating device, which applies at least one of a driving torque and a braking torque to the vehicle, such that a vehicle speed of the vehicle becomes equal to a preset target vehicle speed. This vehicle running control apparatus is equipped with the running road determination device, and control changeover means for changing over a control target that can be changed over when the running road determination means determines that the vehicle is running on the road difficult to run on.

Further, in the above-mentioned vehicle running control apparatus, the control target may be vehicle height adjustment means for adjusting a vehicle height of the vehicle, and the control changeover means may make the vehicle height of the vehicle higher when the running road determination means determines that the vehicle is running on the road difficult to run on than when the running road determination means determines that the vehicle is not running on the road difficult to run on.

Further, in the above-mentioned vehicle running control apparatus, the control target may be air pressure adjustment means for adjusting an air pressure of tires fitted to the vehicle, and the control changeover means may change the air pressure of the tires when the running road determination means determines that the vehicle is running on the road difficult to run on, from a value of the air pressure of the tires at a time when the running road determination means determines that the vehicle is not running on the road difficult to run on.

Further, in the above-mentioned vehicle running control apparatus, the control target may be slip amount adjustment means for adjusting slip amounts of respective wheels of the vehicle, and the control changeover means may make the slip amounts of the respective wheels smaller when the running road determination means determines that the vehicle is running on the road difficult to run on than when the running road determination means determines that the vehicle is not running on the road difficult to run on.

Further, in the above-mentioned vehicle running control apparatus, the control target may be a braking/driving torque generating device for applying the braking torque to the vehicle, and the control changeover means may make the braking torque larger when the running road determination means determines that the vehicle is running on the road difficult to run on than when the running road determination means determines that the vehicle is not running on the road difficult to run on.

Further, in the above-mentioned vehicle running control apparatus, the condition determination means may determine that the running road determination condition is fulfilled when the automatic running control is performed.

In the running road determination device according to the invention, an effect of making possible a reliable determination on the road on which the vehicle is running is achieved. Further, in the vehicle running control apparatus according to the invention, when the running road determination device determines that the vehicle is running on a road difficult to run on, the capacity of the vehicle to cover the whole distance can be enhanced, and an excessive load can be restrained from being applied to the braking/driving torque generating devices or the vehicle. Further, in the vehicle running control apparatus according to the invention, an excessive load can be restrained from being applied to the braking/driving torque generating devices or the vehicle by terminating automatic running control when the running road determination device determines that the vehicle is running on a road difficult to run on.

BRIEF DESCRIPTION OF THE DRAWINGS

The foregoing and further objects, features and advantages of the invention will become apparent from the following description of embodiments with reference to the accompanying drawings, wherein like numerals are used to represent like elements and wherein.

DETAILED DESCRIPTION OF THE EMBODIMENTS

The embodiments of the invention will be described hereinafter in detail with reference to the drawings. The following embodiments of the invention are not intended to limit the invention. Further, components in the following embodiments of the invention include those easily assumable by persons having ordinary skill in the art or those substantially identical to the components.

Figure 1:
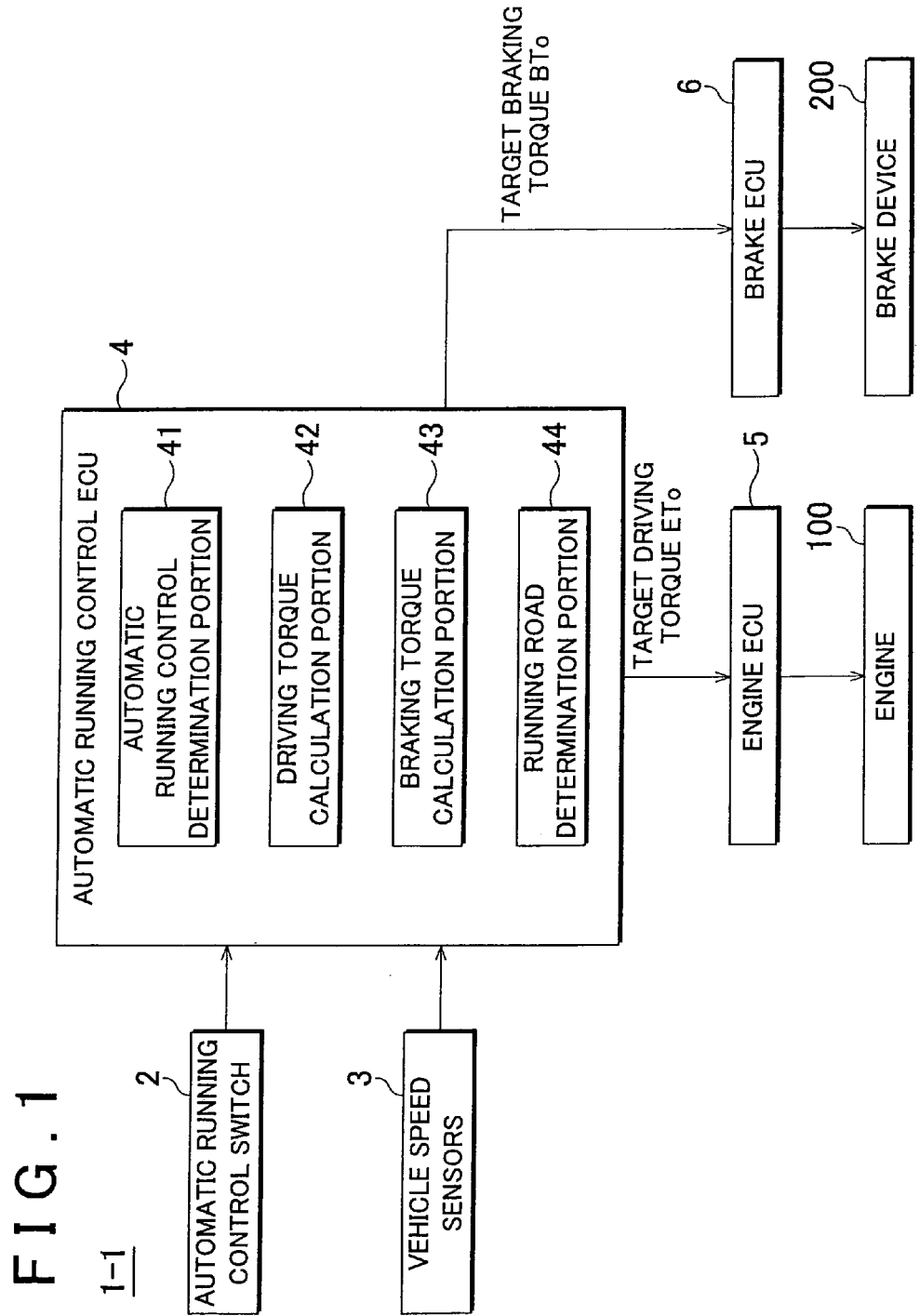
FIG. 1 is a diagram showing a configurational example of a vehicle running control apparatus according to the first embodiment of the invention.

FIG. 1 is a diagram showing a configurational example of a vehicle running control apparatus according to the first embodiment of the invention. A vehicle running control apparatus 1-1 according to the first embodiment of the invention may function as a running road determination device. As shown in FIG. 1, the vehicle running control apparatus 1-1 is mounted on a vehicle (not shown) (hereinafter referred to simply as "a vehicle C"), and performs automatic running control such that the vehicle speed of the vehicle C becomes equal to a target vehicle speed. Further, the vehicle running control apparatus 1-1 determines whether or not the vehicle C is running on a road difficult to run on. The vehicle running control apparatus 1-1 is composed of an automatic running control switch 2, vehicle speed sensors 3, an automatic running control ECU 4, an engine ECU 5, and a brake ECU 6.

An engine 100 is a braking/driving torque generating device for generating a driving torque and applying the generated driving torque to the vehicle C. The engine 100 is controlled by the engine ECU 5 on the basis of a target driving torque ETo calculated by the automatic running control ECU 4, and applies the target driving torque ETo to the vehicle C. Further, a brake device 200 is a braking/driving torque generating device for generating a braking torque and applying the generated braking torque to the vehicle C. The brake device 200 is controlled by the brake ECU 6 on the basis of a target braking torque BTo calculated by the automatic running control ECU 4, and applies the target braking torque BTo to the vehicle C. It should be noted herein that the brake device 200 generates a braking torque on the basis of braking operation performed by a driver, namely, the depression of a brake pedal (not shown) by the driver.

The automatic running control switch 2 is a control start trigger. The automatic running control switch 2 is provided in a compartment (not shown) of the vehicle, and is turned ON by being operated by the driver. The automatic running control switch 2 is connected to the automatic running control ECU 4, and outputs an ON signal to the automatic running control ECU 4 when being turned ON by the driver. Thus, the automatic running control switch 2 serves as a control start trigger for causing the automatic running control ECU 4 to start automatic running control.

The vehicle speed sensors 3 detect a vehicle speed V of the vehicle C. The vehicle speed sensors 3 are connected to the automatic running control ECU 4, and the detected vehicle speed V of the vehicle C is output to the automatic running control ECU 4. It should be noted herein that the vehicle speed sensors 3 are, for example, wheel speed sensors provided at respective wheels (not shown) of the vehicle. In this case, speeds v1 to v4 of the respective wheels from the wheel speed sensors as the vehicle speed sensors 3 provided at the wheels respectively are output to the automatic running control ECU 4, and the automatic running control ECU 4 calculates the vehicle speed V of the vehicle C on the basis of the output speeds v1 to v4 of the respective wheels.

The automatic running control ECU 4 calculates the target driving torque ETo and the target braking torque BTo such that the vehicle speed V of the vehicle C becomes equal to a preset target vehicle speed Vo, and outputs the target driving torque ETo and the target braking torque BTo to the engine ECU 5 and the brake ECU 6 respectively. The automatic running control ECU 4 controls the engine 100 on the basis of the target driving torque ETo via the engine ECU 5, and controls the brake device 200 on the basis of the target braking torque BTo via the brake ECU 6. That is, the automatic running control ECU 4 performs cooperative control of the engine 100 and the brake device 200 such that the vehicle speed V becomes equal to the preset target vehicle speed Vo. The automatic running control ECU 4 has an automatic running control determination portion 41, a driving torque calculation portion 42, a braking torque calculation portion 43, and a running road determination portion 44. It should be noted herein that the hardware configuration of the automatic running control ECU 4 is already known and hence will not be described below. Further, the target vehicle speed Vo is a value allowing the vehicle (not shown) to run off-road at low vehicle speeds, which include, for example, about 10 km/h.

The automatic running control determination portion 41 makes a determination on the driver's intention to start automatic running control. The automatic running control determination portion 41 determines whether to start automatic running control depending on whether or not an ON signal has been output through the operation of the automatic running control switch 2 by the driver, namely, on the basis of an ON/OFF state of the automatic running control switch 2. Further, the automatic running control determination portion 41 functions as a condition determination portion as well. It should be noted herein that the condition determination portion determines whether or not a running road determination condition is fulfilled. That is, in the vehicle running control apparatus 1-1 as the running road determination device, the automatic running control determination portion 41 determines whether or not the running road determination condition for determining whether or not the vehicle C is running on a road difficult to run on is fulfilled. The running road determination condition is that automatic running control be performed by the vehicle running control apparatus 1-1. That is, the automatic running control determination portion 41 determines, on the basis of the ON/OFF state of the automatic running control switch 2, whether or not the running road determination condition is fulfilled.

The driving torque calculation portion 42 calculates the target driving torque ETo generated by the engine 100. The driving torque calculation portion 42 calculates the target driving torque ETo such that a vehicle speed V of a vehicle (not shown) becomes equal to a preset target vehicle speed Vo.

The braking torque calculation portion 43 calculates the target braking torque BTo generated by the brake device 200. The braking torque calculation portion 43 calculates the target braking torque BTo such that the vehicle speed V of the vehicle becomes equal to the preset target vehicle speed Vo.

The running road determination portion 44 determines, on the basis of at least one of a driving torque applied to the vehicle C and a braking torque applied to the vehicle C, whether or not the vehicle is running on a road difficult to run on. In the first embodiment of the invention, the running road determination portion 44 determines, on the basis of the target driving torque ETo calculated by the automatic running control ECU 4 as the driving torque applied to the vehicle C and the target braking torque BTo calculated by the automatic running control ECU 4 as the braking torque applied to the vehicle C, whether or not the vehicle C is running on a road difficult to run on.

Further, the running road determination portion 44 functions as a weighting portion as well. The running road determination portion 44 sets weighted values for the driving torque and the braking torque in accordance with the running situation of the vehicle C. Accordingly, the running road determination portion 44 determines, in accordance with the sum of the weighted driving torque and the weighted braking torque, that the vehicle C is running on a road difficult to run on. In the first embodiment of the invention, weighted values GE and GB for the calculated target driving torque ETo and the calculated target braking torque BTo are set in accordance with the running situation of the vehicle C, a sum GT (=GE× ETo+GB×BTo) of the weighted target driving torque (GE× ETo) and the weighted target braking torque (GB×ETo) is calculated, and it is determined that the vehicle C is running on a road difficult to run on when the calculated sum GT is larger than a predetermined value TL. It should be noted herein that the predetermined value TL is equal to the sum GT that is calculated when the vehicle C is running on a road difficult to run on.

The engine ECU 5 controls the engine 10 on the basis of the target driving torque ETo. The engine ECU 5 is connected to the automatic running control ECU 4, and controls the engine 100 on the basis of the target driving torque ETo that has been calculated by the automatic running control ECU 4 and output. The engine ECU 5 is also connected to an accelerator sensor (not shown), which can detect an amount of acceleration operation performed by the driver, controls the engine 100 on the basis of the detected amount of acceleration operation, and causes the engine 100 to generate a driving torque based on the amount of acceleration operation performed by the driver.

The brake ECU 6 controls the brake device 200 on the basis of the target braking torque BTo. The brake ECU 6 is connected to the automatic running control ECU 4, and controls the brake device 200 on the basis of the target braking torque BTo that has been calculated by the automatic running control ECU 4 and output. The brake device 200 is so constructed as to be capable of applying braking torques to the respective wheels. The brake ECU 6 controls the brake device 200 on the basis of target braking torques BToW1 to BToW4 for the respective wheels, which have been calculated by the automatic running control ECU 4 and output, and applies the braking torques to the respective wheels to apply a braking torque to the vehicle C.

Figure 2:
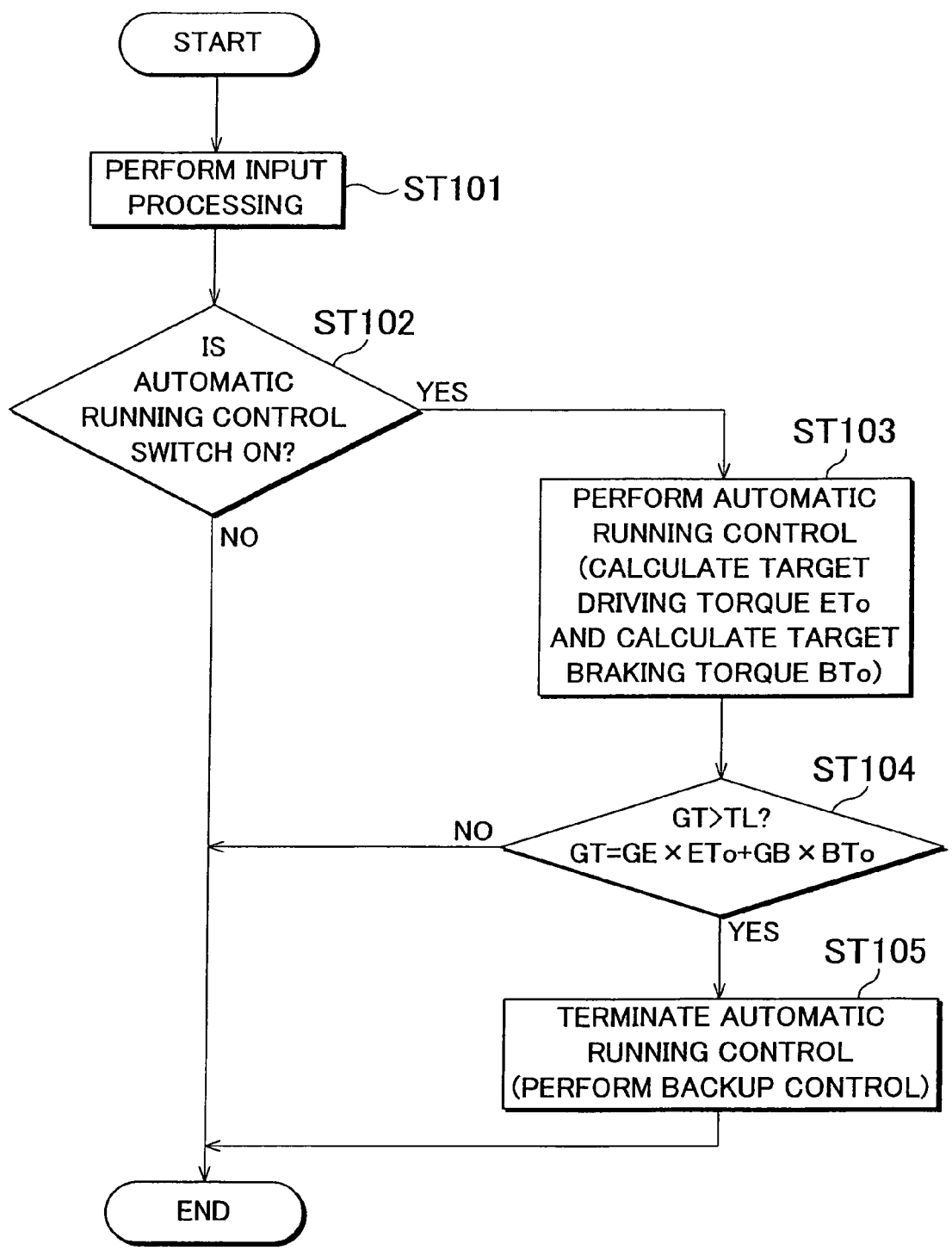
FIG. 2 is a diagram showing the flow of automatic running control performed by the vehicle running control apparatus according to the first embodiment of the invention.
Figure 3:
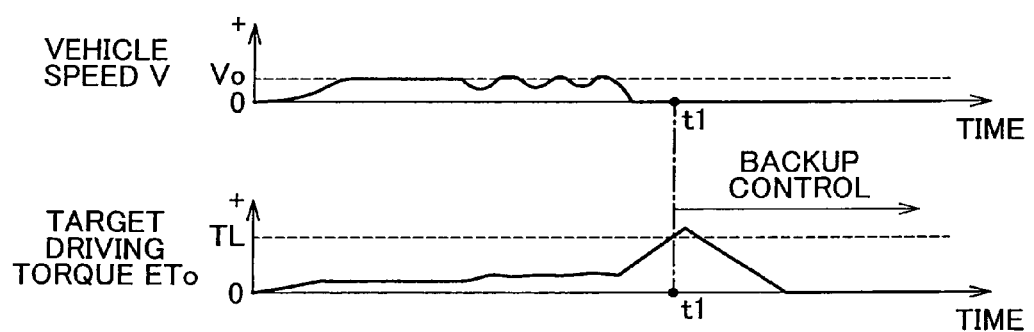
FIG. 3 is a diagram for explaining the operation of the vehicle running control apparatus according to the first embodiment of the invention.

Next, automatic running control performed using the vehicle running control apparatus 1-1 according to the first embodiment of the invention will be described. FIG. 2 is a diagram showing the flow of automatic running control performed by the vehicle running control apparatus according to the first embodiment of the invention. FIG. 3 is a diagram for explaining the operation of the vehicle running control apparatus according to the first embodiment of the invention. Now, as for automatic running control performed using the vehicle running control apparatus 1-1, a method of terminating automatic running control using a running road determination method will be described. The vehicle running control apparatus 1-1 performs automatic running control on a control cycle thereof.

First of all, as shown in FIG. 2, the automatic running control ECU 4 performs an input processing (step ST101). In this step, the automatic running control ECU 4 acquires an ON/OFF state of the automatic running control switch 2, the vehicle speed V detected and output by the vehicle speed sensors 3, and the like.

The automatic running control determination portion 41 of the automatic running control ECU 4 then determines whether or not the automatic running control switch 2 is ON (step ST102). It should be noted herein that the automatic running control determination portion 41 makes a determination on the driver's intention to start automatic running control on the basis of the aforementioned acquired ON/OFF state of the automatic running control switch 2. Further, the automatic running control determination portion 41 determines, on the basis of the ON/OFF state of the automatic running control switch 2, whether or not the running road determination condition is fulfilled.

Then, when it is determined that the automatic running control switch 2 is ON (YES in step ST102), the automatic running control ECU 4 performs automatic running control (step ST103). It should be noted herein that the automatic running control ECU 4 performs automatic running control such that the vehicle speed V of the vehicle C becomes equal to the target vehicle speed Vo. The driving torque calculation portion 42 of the automatic running control ECU 4 calculates the target driving torque ETo such that the aforementioned acquired vehicle speed V becomes equal to the target vehicle speed Vo, and outputs the calculated target driving torque ETo to the engine ECU 5. More specifically, the driving torque calculation portion 42 calculates the target driving torque ETo through PID control such that the vehicle speed V becomes equal to the target vehicle speed Vo. The target driving torque ETo calculated through PID control increases as the differential term of PID control is accumulated. That is, the more difficult it becomes for the vehicle C to run on a road, the longer the state of a large difference between the vehicle speed V and the target vehicle speed Vo lasts. Therefore, the target driving torque is calculated as an increased value. The engine ECU 5 controls the engine 100 on the basis of the output target driving torque ETo, and applies a driving torque to the vehicle C. Further, the braking torque calculation portion 43 of the automatic running control ECU 4 calculates the target braking torque BTo such that the aforementioned acquired vehicle speed V becomes equal to the target vehicle speed Vo, and outputs the calculated target braking torque BTo to the brake ECU 6. The brake ECU 6 controls the brake device 200 on the basis of the output target braking torque BTo, and applies a braking torque to the vehicle C. For example, when the acquired vehicle speed V is lower than the target vehicle speed Vo, the automatic running control ECU 4 calculates the target driving torque ETo to accelerate the vehicle C, and calculates the target braking torque BTo as 0. On the other hand, when the acquired vehicle speed V is higher than the target vehicle speed Vo, the automatic running control ECU 4 calculates the target driving torque ETo as a value smaller than a value calculated last time or as 0 to decelerate the vehicle C, and calculates the target braking torque BTo.

Then, since it is determined that the automatic running control switch 2 is ON (YES in step ST102), the running road determination portion 44 of the automatic running control ECU 4 determines whether or not the sum GT (=GE×ETo+ GB×BTo) is larger than the predetermined value TL (step ST104). In this step, the running road determination portion 44 determines, on the basis of the calculated target driving torque ETo and the calculated target braking torque BTo, whether or not the vehicle C is running on a road difficult to run on. For example, given that the weighted values GE and GB are equal to 1 and 0 respectively, the sum GT is simply equal to the target driving torque ETo, and the predetermined value TL is equal to the target driving torque ETo that is calculated by the automatic running control ECU 4 such that the vehicle speed V of the vehicle C becomes equal to the target vehicle speed Vo when the vehicle C is running on a road difficult to run on. Accordingly, as shown in FIG. 3, when the vehicle C runs on a running road with a great road surface interference or the like, the target driving torque ETo as the sum GT becomes larger than the predetermined value TL (as indicated by t1 in FIG. 3), and it is determined that the vehicle C is running on a road difficult to run on.

Then, as shown in FIG. 2, when it is determined that the sum GT is larger than the predetermined value TL (YES in step ST104), the automatic running control ECU 4 terminates automatic running control (step ST105). In this step, as shown in FIG. 3, when it is determined that the vehicle C is running on a road difficult to run on (as indicated by t1 in FIG. 3), the automatic running control ECU 4 performs backup control to forcibly terminate automatic running control. It should be noted herein that backup control is designed to calculate the target driving torque ETo and the target braking torque BTo by means of the automatic running control ECU 4 such that the driving force or braking force applied to the vehicle C gradually decreases to become equal to 0 eventually, and to control the engine 100 and the brake device 200 via the engine ECU 5 and the brake ECU 6 respectively.

As shown in FIG. 2, the automatic running control ECU 4 terminates a current control cycle and makes a transit to a subsequent control cycle when automatic running control is terminated, when it is determined that the automatic running control switch 2 is OFF (NO in step ST102), or when it is determined that the sum GT is smaller than the predetermined value TL (NO in step ST104).

As described above, in the vehicle running control apparatus 1-1 according to the first embodiment of the invention, it is determined, on the basis of the braking/driving torque applied to the vehicle C, whether or not the vehicle C is running on a road difficult to run on. It should be noted herein that, in the vehicle running control apparatus 1-1, the braking/driving torque continues to be applied to the vehicle C when the vehicle speed V of the vehicle C has not become equal to the target vehicle speed Vo. It is more difficult to make the vehicle speed V of the vehicle C equal to the target vehicle speed Vo when the vehicle C is running on a road difficult to run on than when the vehicle C is running on a road easy to run on. Accordingly, the braking/driving force applied to the vehicle C by the vehicle running control apparatus 1-1 is definitely larger when the vehicle C is running on a road difficult to run on than when the vehicle C is running on a road easy to run on. Thus, a determination can be reliably made on a road on which the vehicle C is running.

An art for determining, on the basis of the spinning of the respective wheels, whether or not the vehicle C is running on a road difficult to run on is also conceivable. However, when all the wheels are spinning on a muddy road or the like, it may be impossible to determine that the vehicle C is running on a road difficult to run on. Further, an art for determining, on the basis of the deviation amount of the vehicle C, whether or not the vehicle C is running on a road difficult to run on is also conceivable. However, when the vehicle C is, for example, in contact with an obstacle or thereon, the deviation amount of the vehicle C is small, and it may be impossible to determine that the vehicle C is running on a road difficult to run on. Further, an art for determining, on the basis of the vertical acceleration of the vehicle C, whether or not the vehicle C is running on a road difficult to run on is also conceivable. However, when the vehicle C is, for example, in contact with an obstacle or thereon, the vertical acceleration of the vehicle C is small, and it may be impossible to determine that the vehicle C is running on a road difficult to run on. In comparison with these arts as well, according to this embodiment of the invention, a determination can be reliably made on a road on which the vehicle C is running.

Further, in the vehicle running control apparatus 1-1 according to the first embodiment of the invention, when it is determined that the vehicle C is running on a road difficult to run on, automatic running control is terminated. Accordingly, automatic running control is terminated before an excessive load is applied to the engine 100, the brake device 200, or the vehicle C. Therefore, an excessive load can be restrained from being applied to the engine 100, the brake device 200, or the vehicle C.

In the foregoing first embodiment of the invention, automatic running control is terminated when it is determined that the sum GT has become larger than the single predetermined value TL. However, the invention is not limited to this configuration. It is appropriate that the vehicle running control apparatus 1-1 have a plurality of predetermined values TL(1~n), and that a change in control be made every time the sum GT becomes larger than each of the predetermined values TL (1~n). That is, it is appropriate to set a plurality of levels for a road difficult to run on, and change the control to be performed every time the level for the road difficult to run on increases. For example, it is appropriate to drive a buzzer provided in the compartment of the vehicle C and light that one of warning level lamps on a meter panel which corresponds to level 1 when it is determined that the sum GT has become larger than the first predetermined value TL1, and light all the warning lamps on the meter panel corresponding to all levels while keeping driving the buzzer and terminate automatic running control when it is determined that the sum GT has become larger than the last predetermined value TLn.

Further, in the foregoing first embodiment of the invention, the termination of automatic running control may be maintained until the end of backup control and be canceled thereafter. The start of automatic running control may be permitted again after the cancellation.

Figure 4:
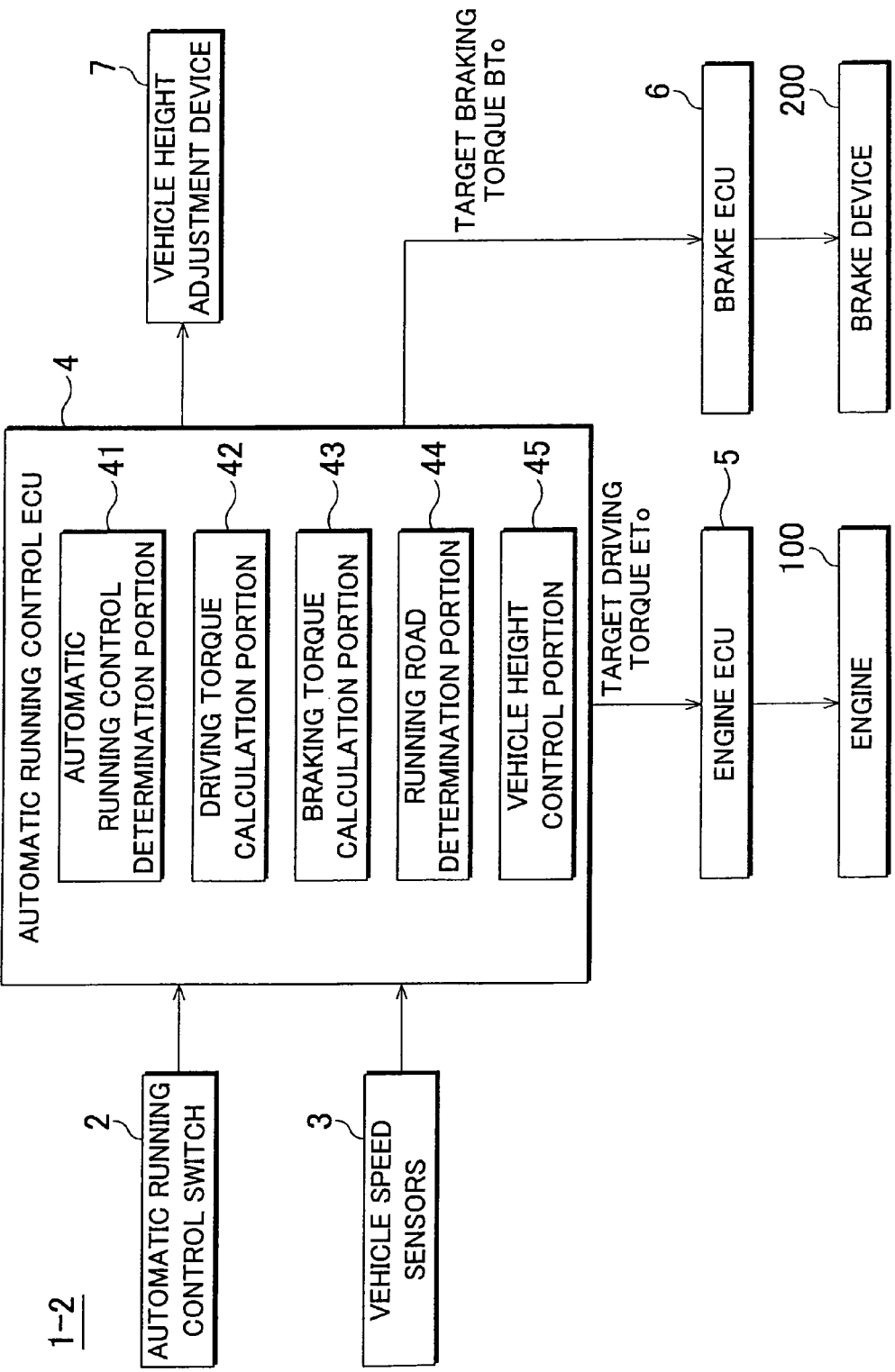
FIG. 4 is a diagram showing a configurational example of a vehicle running control apparatus according to the second embodiment of the invention.

Next, a vehicle running control apparatus according to the second embodiment of the invention will be described. FIG. 4 is a diagram showing a configurational example of the vehicle running control apparatus according to the second embodiment of the invention. A vehicle running control apparatus 1-2 according to the second embodiment of the invention is different from the vehicle running control apparatus 1-1 according to the first embodiment of the invention in that a vehicle height adjustment device 7 for adjusting the vehicle height of the vehicle C is provided to adjust the vehicle height of the vehicle C depending on whether or not the vehicle C is running on a road difficult to run on. It should lie noted herein that that part of the vehicle running control apparatus 1-2 according to the second embodiment of the invention which is identical in basic configuration to the vehicle running control apparatus 1-1 according to the first embodiment of the invention as shown in FIG. 4 will not be described hereinafter.

The automatic running control ECU 4 has a vehicle height control portion 45. The vehicle height control portion 45 functions as a control changeover portion, and performs changeover control, namely, the control of changing over the vehicle height of the vehicle C by means of the vehicle height adjustment device 7. When the running road determination portion 44 determines that the vehicle C is running on a road difficult to run on, the vehicle height control portion 45 performs control to change over the vehicle height adjustment device 7 to an HI state where the vehicle height of the vehicle C is high.

The vehicle height adjustment device 7 is a control target that can be changed over. The vehicle height adjustment device 7 adjusts the vehicle height of the vehicle C. In the second embodiment of the invention, the vehicle height adjustment device 7 can be changed over between a LOW state where the vehicle height of the vehicle C is low and the HI state where the vehicle height of the vehicle C is higher than in the LOW state. The above-mentioned vehicle height control portion 45 performs changeover control between the LOW state and the HI state.

Figure 5:
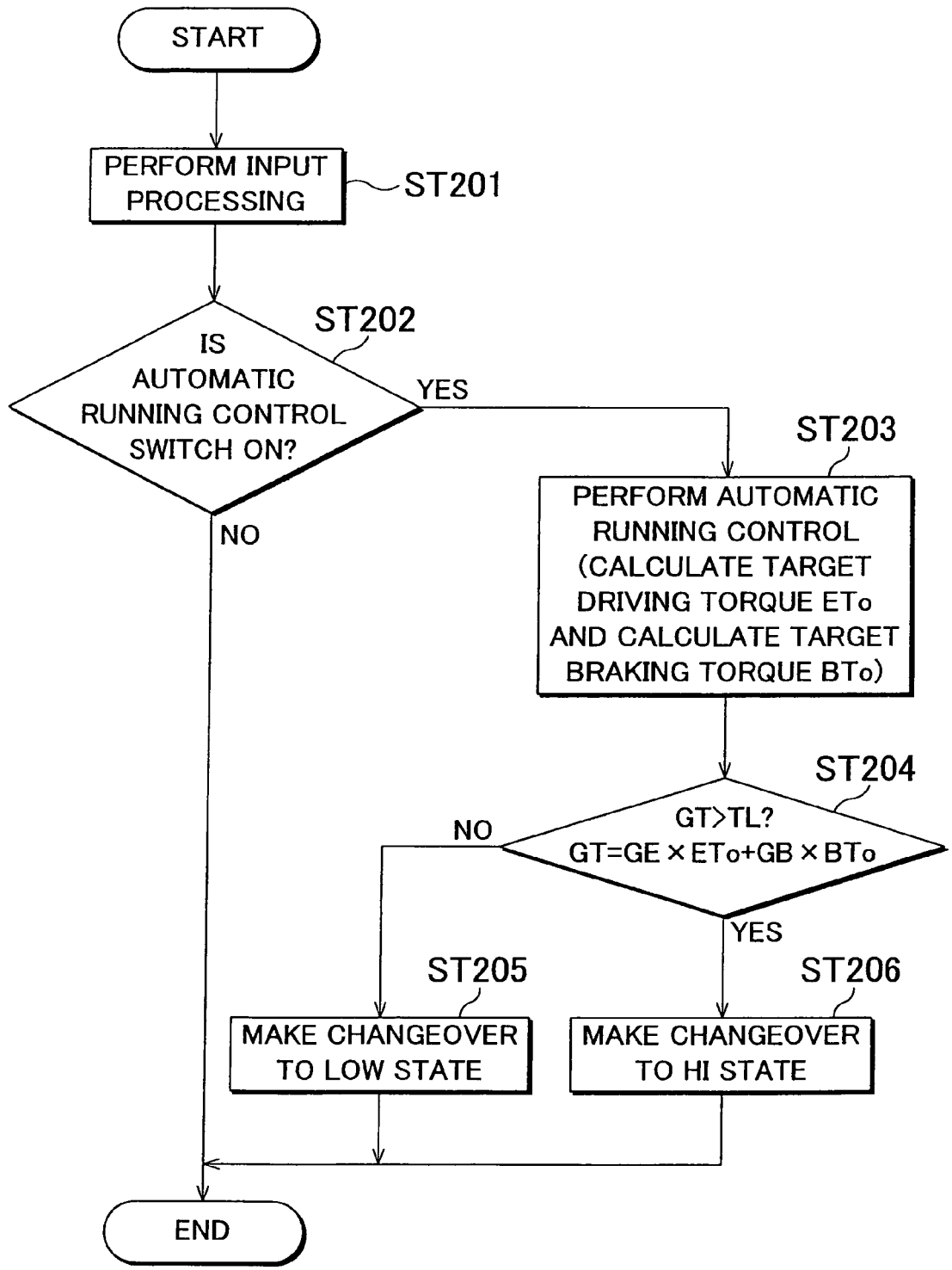
FIG. 5 is a diagram showing the flow of automatic running control performed by the vehicle running control apparatus according to the second embodiment of the invention.
Figure 6:
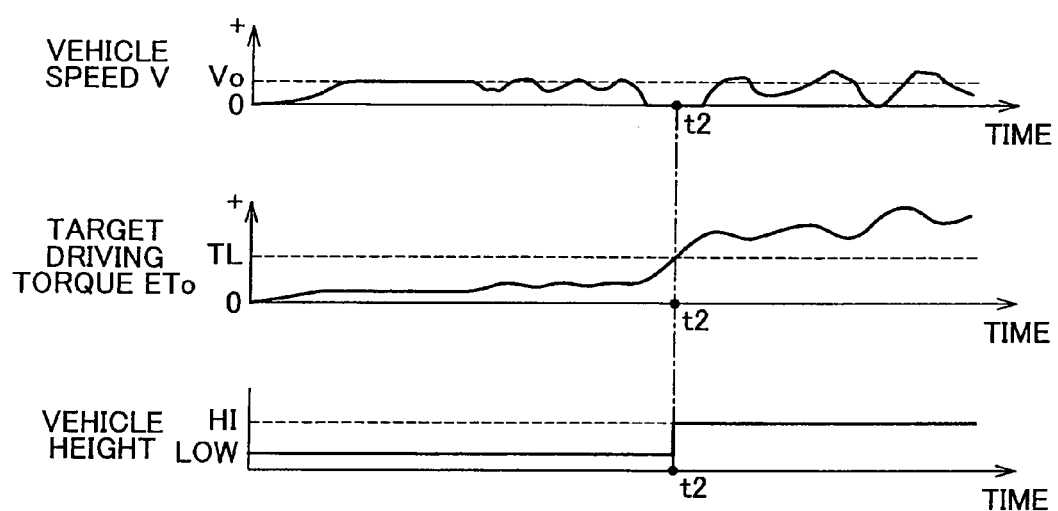
FIG. 6 is a diagram for explaining the operation of the vehicle running control apparatus according to the second embodiment of the invention.

Next, automatic running control performed using the vehicle running control apparatus 1-2 according to the second embodiment of the invention will be described. FIG. 5 is a diagram showing the flow of automatic running control performed by the vehicle running control apparatus according to the second embodiment of the invention. FIG. 6 is a diagram for explaining the operation of the vehicle running control apparatus according to the second embodiment of the invention. Now, as for automatic running control performed using the vehicle running control apparatus 1-2, a method of changing over the vehicle height of the vehicle C using a running road determination method will be described. Part of automatic running control performed using the vehicle running control apparatus 1-2 according to the second embodiment of the invention that is identical to automatic running control performed using the vehicle running control apparatus 1-1 according to the first embodiment of the invention will be described in a simplified manner. Further, the vehicle running control apparatus 1-2 performs vehicle running control on a control cycle thereof.

First of all, as shown in FIG. 5, the automatic running control ECU 4 performs an input processing (step ST201).

The automatic running control determination portion 41 of the automatic running control ECU 4 then determines whether or not the automatic running control switch 2 is ON (step ST202).

Then, when it is determined that the automatic running control switch 2 is ON (YES in step ST202), the automatic running control ECU 4 performs automatic running control (step ST203).

Then, since it is determined that the automatic running control switch 2 is ON (YES in step ST202), the automatic running control ECU 4 determines whether or not the sum GT (=GE×ETo+GB×BTo) is larger than the predetermined value TL (step ST204). In this step, the automatic running control ECU 4 determines, on the basis of the calculated target driving torque ETo and the calculated target braking torque BTo, whether or not the vehicle C is running on a road difficult to run on. For example, given that the weighted values GE and GB are equal to 1 and 0 respectively, the sum GT is simply equal to the target driving torque ETo, and the predetermined value TL is equal to the target driving torque ETo that is calculated by the automatic running control ECU 4 such that the vehicle speed V of the vehicle C becomes equal to the target vehicle speed Vo when the vehicle C is running on a road difficult to run on. Accordingly, as shown in FIG. 6, when the vehicle C runs on, for example, a road with a great road surface interference, the target driving torque ETo as the sum GT becomes larger than the predetermined value TL (as indicated by t2 in FIG. 6), and it is determined that the vehicle C is running on a road difficult to run on.

As shown in FIG. 5, when it is determined that the sum GT is equal to or smaller than the predetermined value TL (NO in step ST204), the vehicle height control portion 45 of the automatic running control ECU 4 then performs control to change over the vehicle height adjustment device 7 to the LOW state (step ST205). In this step, as shown in FIG. 6, when it is determined that the vehicle C is not running on a road difficult to run on, the vehicle height control portion 45 performs control to change over the vehicle height adjustment device 7 to the LOW state. Thus, the vehicle height of the vehicle C is adjusted to be lower than in the case of the HI state.

Further, as shown in FIG. 5, when it is determined that the sum GT is larger than the predetermined value TL (YES in step ST204), the vehicle height control portion 45 of the automatic running control ECU 4 performs control to change over the vehicle height adjustment device 7 to the HI state (step ST206). In this step, as shown in FIG. 6, when it is determined that the vehicle C is running on a road difficult to run on (as indicated by t2 in FIG. 6), the vehicle height control portion 45 performs control to change over the vehicle height adjustment device 7 to the HI state. Thus, the vehicle height of the vehicle C is adjusted to be higher than in the case of the LOW state.

As shown in FIG. 5, the automatic running control ECU 4 terminates a current control cycle and makes a transition to a subsequent control cycle when the vehicle height adjustment device 7 is controlled to be changed over to the LOW state, when the vehicle height adjustment device 7 is controlled to be changed over to the HI state, or when it is determined that the automatic running control switch 2 is OFF (NO in step ST202).

As described above, in the vehicle running control apparatus 1-2 according to the second embodiment of the invention, as is the case with the foregoing first embodiment of the invention, it is determined, on the basis of the braking/driving torque applied to the vehicle C, whether or not the vehicle C is running on a road difficult to run on. Therefore, a determination can be reliably made on a road on which the vehicle C is running.

Further, in the vehicle running control apparatus 1-2 according to the second embodiment of the invention, the vehicle height of the vehicle C is made higher when it is determined that the vehicle C is running on a road difficult to run on than when it is determined that the vehicle C is not running on a road difficult to run on. Accordingly, an obstacle such as a rock, a step, or the like, which is insurmountable when the vehicle height of the vehicle C is low, can be surmounted by increasing the height of the vehicle C. In other words, the road surface interference for the vehicle C can be reduced to enhance the capacity of the vehicle C to cover the whole distance by increasing the height of the vehicle C. Thus, during automatic running control, an obstacle such as a rock or the like, which can be surmounted by increasing the vehicle height of the vehicle C, can be restrained from becoming insurmountable due to a low vehicle height. As a result, the road surface interference can be reduced, and an excessive load can be restrained from being applied to the engine 100, the brake device 200, or the vehicle C due to the vehicle speed V that does not become equal to the target vehicle speed Vo.

In the foregoing second embodiment of the invention, when it is determined that the sum GT has become larger than the single predetermined value TL, the vehicle height adjustment device 7 is controlled to be changed over to the HI state. However, the invention is not limited to this configuration. The vehicle height control portion 45 can arbitrarily adjust the vehicle height of the vehicle C by means of the vehicle height adjustment device 7, and the vehicle running control apparatus 1-2 may have a plurality of predetermined values TL(1~n). In this case, it is appropriate that a plurality of levels for a road difficult to run on be set, and that the vehicle height control portion 45 increase the vehicle height of the vehicle C by means of the vehicle height adjustment device 7 every time the sum GT becomes larger than each of the predetermined values TL(1~n), namely, every time the level for a road difficult to run on increases. Further, it is appropriate to terminate automatic running control itself instead of increasing the vehicle height of the vehicle C when the level for a road difficult to run on is high, for example, when the sum GT is larger than TLn.

Further, in the foregoing second embodiment of the invention, after it is determined that the sum GT is larger than the predetermined value TL and the vehicle height adjustment device 7 is controlled to be changed over to the HI state, the vehicle height adjustment device 7 may be held in the HI state until the sum GT becomes equal to or smaller than a cancellation predetermined value TLL. That is, the control of changing over the vehicle height adjustment device 7 from the HI state to the LOW state may be permitted when the sum GT becomes equal to or smaller than the cancellation predetermined value ILL. The automatic running control ECU 4 may perform control to change over the vehicle height adjustment device 7 from the HI state to the LOW state when the sum GT remains equal to or smaller than the cancellation predetermined value TLL for a predetermined time. Further, the automatic running control ECU 4 may perform control to change over the vehicle height adjustment device 7 from the HI state to the LOW state when the sum GT remains equal to or smaller than the cancellation predetermined value TLL for a predetermined time and the vehicle C has covered a certain distance.

Figure 7:
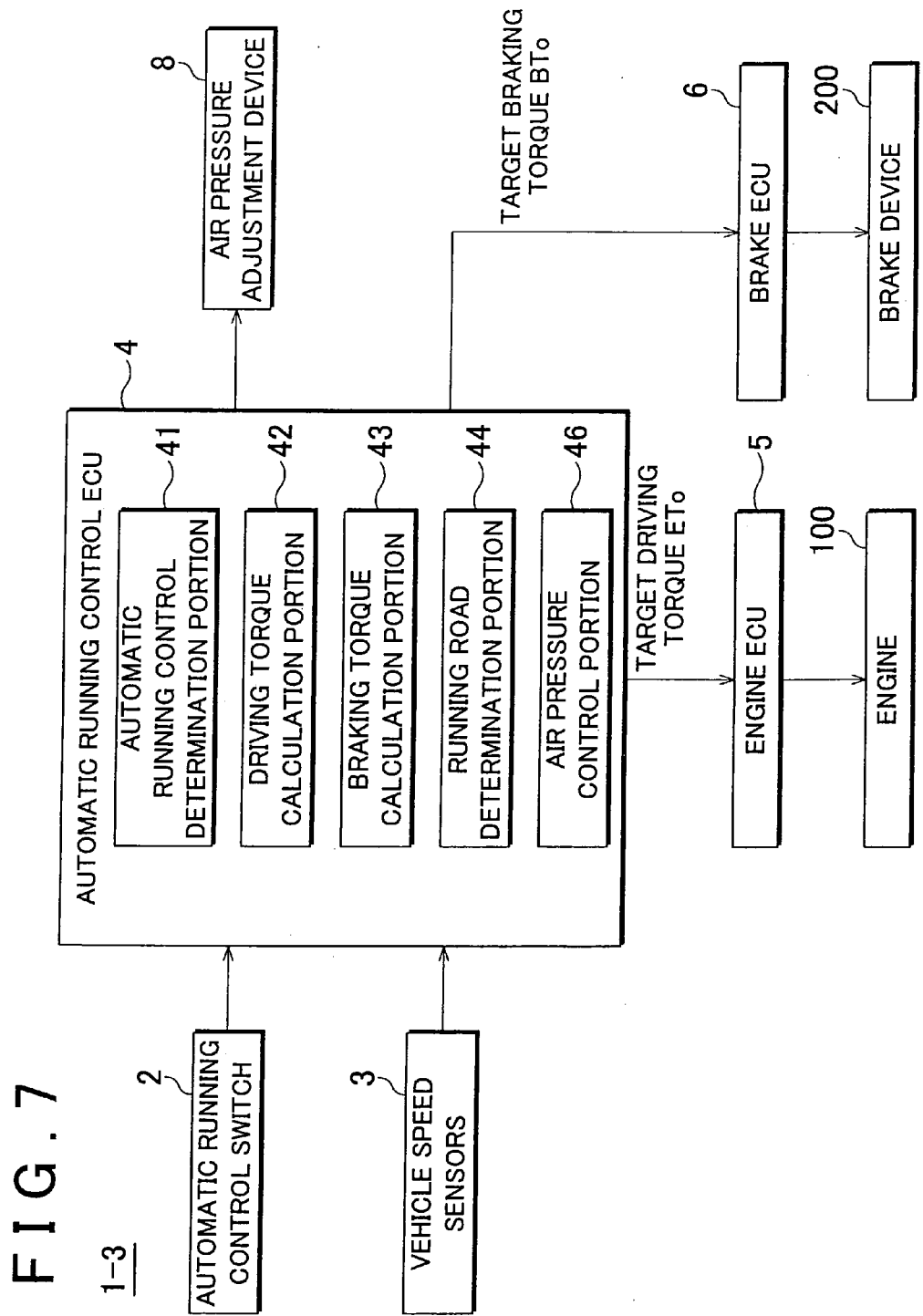
FIG. 7 is a diagram showing a configurational example of a vehicle running control apparatus according to the third embodiment of the invention.

Next, a vehicle running control apparatus according to the third embodiment of the invention will be described. FIG. 7 is a diagram showing a configurational example of the vehicle running control apparatus according to the third embodiment of the invention. A vehicle running control apparatus 1-3 according to the third embodiment of the invention is different from the vehicle running control apparatus 1-1 according to the first embodiment of the invention in that an air pressure adjustment device 8 for adjusting the air pressure of tires (not shown) fitted to the vehicle C is provided to adjust the air pressure of the tires depending on whether or not the vehicle C is running on a road difficult to run on. It should be noted herein that that part of the vehicle running control apparatus 1-3 according to the third embodiment of the invention which is identical in basic configuration to the vehicle running control apparatus 1-1 according to the first embodiment of the invention as shown in FIG. 7 will not be described hereinafter.

The automatic running control ECU 4 has an air pressure control portion 46. The air pressure control portion 46 functions as a control changeover portion, and performs changeover control, namely, the control of changing over the air pressure of the tires (not shown) by means of the air pressure adjustment device 8. When the running road determination portion 44 determines that the vehicle C is running on a road difficult to run on, the air pressure control portion 46 performs control to change over the air pressure adjustment device 8 to an UP state where the air pressure of the tires is high.

The air pressure adjustment device 8 is a control target that can be changed over. The air pressure adjustment device 8 adjusts the air pressure of the tires (not shown) fitted to the vehicle C. In the third embodiment of the invention, the air pressure adjustment device 8 can be changed to a DOWN state where the air pressure of the tires is low and the UP state where the air pressure of the tires is higher than in the DOWN state. The above-mentioned air pressure control portion 46 performs control to make a changeover between the DOWN state and the UP state.

Figure 8:
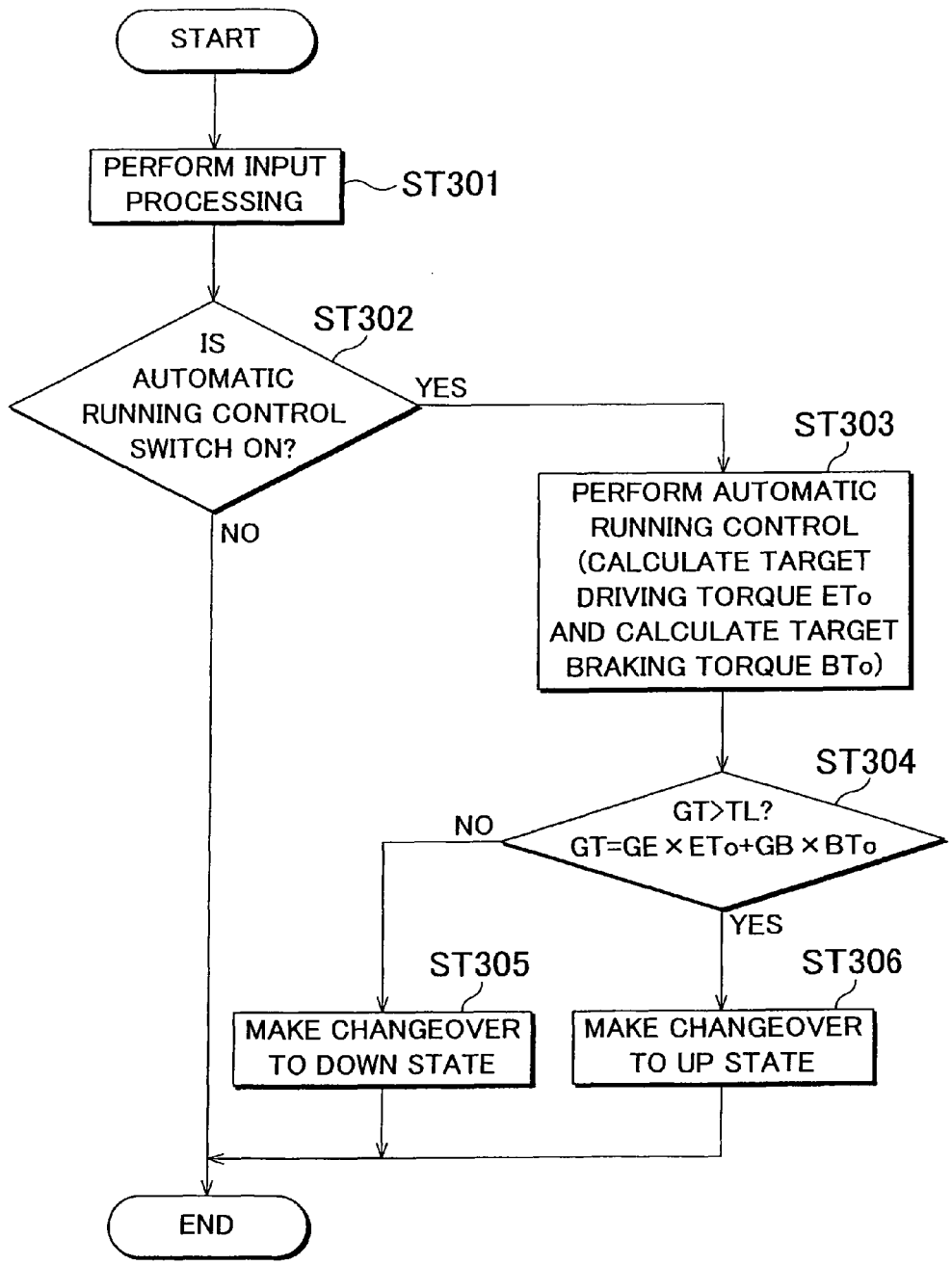
FIG. 8 is a diagram showing the flow of automatic running control performed by the vehicle running control apparatus according to the third embodiment of the invention.
Figure 9:
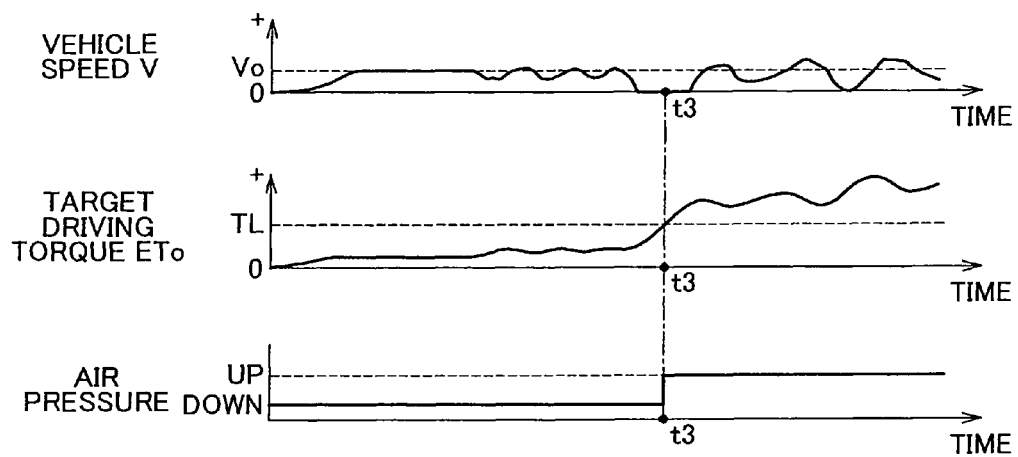
FIG. 9 is a diagram for explaining the operation of the vehicle running control apparatus according to the third embodiment of the invention.

Next, automatic running control performed using the vehicle running control apparatus 1-3 according to the third embodiment of the invention will be described. FIG. 8 is a diagram showing the flow of automatic running control performed by the vehicle running control apparatus according to the third embodiment of the invention. FIG. 9 is a diagram for explaining the operation of the vehicle running control apparatus according to the third embodiment of the invention. Now, as for automatic running control performed using the vehicle running control apparatus 1-3, a method of performing control to change over the air pressure of the tires (not shown) fitted to the vehicle C using a running road determination method will be described. Part of automatic running control performed using the vehicle running control apparatus 1-3 according to the third embodiment of the invention that is identical to automatic running control performed using the vehicle running control apparatus 1-1 according to the first embodiment of the invention will be described in a simplified manner. Further, the vehicle running control apparatus 1-3 performs vehicle running control on a control cycle thereof.

First of all, as shown in FIG. 8, the automatic running control ECU 4 performs an input processing (step ST301).

The automatic running control determination portion 41 of the automatic running control ECU 4 determines whether or not the automatic running control switch 2 is ON (step ST302).

Then, when it is determined that the automatic running control switch 2 is ON (YES in step ST302), the automatic running control ECU 4 performs automatic running control (step ST303).

Then, since it is determined that the automatic running control switch 2 is ON (YES in step ST302), the automatic running control ECU 4 determines whether or not the sum GT (=GE×ETo+GE×BTo) is larger than the predetermined value TL (step ST304). In this step, the automatic running control ECU 4 determines, on the basis of the calculated target driving torque ETo and the calculated target braking torque BTo, whether or not the vehicle C is running on a road difficult to run on. For example, given that the weighted values GE and GB are equal to 1 and 0 respectively, the sum GT is simply equal to the target driving torque ETo, and the predetermined value TL is equal to the target driving torque ETo that is calculated by the automatic running control ECU 4 such that the vehicle speed V of the vehicle C becomes equal to the target vehicle speed Vo when the vehicle C is running on a road difficult to run on. Accordingly, as shown in FIG. 9, when the vehicle C runs on, for example, a road with a great road surface interference, the target driving torque ETo as the sum GT becomes larger than the predetermined value TL (as indicated by t3 in FIG. 9), and it is determined that the vehicle C is running on a road difficult to run on.

Then, as shown in FIG. 8, when it is determined that the sum GT is equal to or smaller than the predetermined value TL (NO in step ST304), the air pressure control portion 46 of the automatic running control ECU 4 performs control to change over the air pressure adjustment device 8 to the DOWN state (step ST305). In this step, as shown in FIG. 9, when it is determined that the vehicle C is hot running on a road difficult to run on, the air pressure control portion 46 performs control to change over the air pressure adjustment device 8 to the DOWN state. Thus, the air pressure of the tires (not shown) is adjusted to be lower than in the case of the UP state.

Further, as shown in FIG. 8, when it is determined that the sum GT is larger than the predetermined value TL (YES in step ST304), the air pressure control portion 46 of the automatic running control ECU 4 performs control to change over the air pressure adjustment device 8 to the UP state (step ST306). In this step, as shown in FIG. 9, when it is determined that the vehicle C is running on a road difficult to run on (as indicated by t3 in FIG. 9), the air pressure control portion 46 performs control to change over the air pressure adjustment device 8 to the UP state. Thus, the air pressure of the tires (not shown) is adjusted to be higher than in the case of the DOWN state.

As shown in FIG. 8, the automatic running control ECU 4 terminates a current control cycle and makes a transition to a subsequent control cycle when the air pressure adjustment device 8 is controlled to be changed over to the DOWN state, when the air pressure adjustment device 8 is controlled to be changed over to the UP state, or when it is determined that the automatic running control switch 2 is OFF (NO in step ST302).

As described above, in the vehicle running control apparatus 1-3 according to the third embodiment of the invention, as is the case with the foregoing first embodiment of the invention, it is determined, on the basis of the braking/driving torque applied to the vehicle C, whether, or not the vehicle C is running, on a road difficult to run on. Therefore, a determination can be reliably made on a road on which the vehicle C is running.

Further, in the vehicle running control apparatus 1-3 according to the third embodiment of the invention, the air pressure of the tires (not shown) fitted to the vehicle C is made higher when it is determined that the vehicle C is running on a road difficult to run on than when it is determined that the vehicle C is not running oh a road difficult to run on. Accordingly, an obstacle such as a rock, a step, or the like, which is insurmountable when the vehicle height of the vehicle C is low, can be surmounted by increasing the air pressure of the tires to increase the vehicle height of the vehicle C. In other words, the road surface interference for the vehicle C can be reduced to enhance the capacity of the vehicle C to cover the whole distance by increasing the air pressure of the tires to increase the vehicle height of the vehicle C. Thus, during automatic running control, an obstacle such as a rock or the like, which can be surmounted by increasing the vehicle height of the vehicle C, can be restrained from becoming insurmountable due to a low vehicle height. As a result, the road surface interference can be reduced, and an excessive load can be restrained from being applied to the engine 100, the brake device 200, or the vehicle C due to the vehicle speed V that does not become equal to the target vehicle speed Vo.

In the foregoing third embodiment of the invention, when it is determined that the sum GT has become larger than the single predetermined value TL, the air pressure adjustment device 8 is controlled to be changed over to the UP state. However, the invention is not limited to this configuration. The air pressure control portion 46 can arbitrarily adjust the air pressure of the tires (not shown) fitted to the vehicle C by means of the air pressure adjustment device 8, and the vehicle running control apparatus 1-3 may have a plurality of predetermined values TL(1~n). In this case, it is appropriate that a plurality of levels for a road difficult to run on be set, and that the air pressure control portion 46 increase the air pressure of the tires by means of the air pressure adjustment device 8 every time the sum GT becomes larger than each of the predetermined values TL(1~n), namely, every time the level for a road difficult to run on increases. Further, it is appropriate to terminate automatic running control itself instead of changing the air pressure of the tires when the level for a road difficult to run on is high, for example, when the sum GT is larger than TLn.

Further, in the foregoing third embodiment of the invention, after it is determined that the sum GT is larger than the predetermined value TL and the air pressure adjustment device 8 is controlled to be changed over to the UP state, the air pressure adjustment device 8 may be held in the UP state until the sum GT becomes equal to or smaller than the cancellation predetermined value TLL. That is, the control of changing over the air pressure adjustment device 8 from the UP state to the DOWN state may be permitted when the sum GT becomes equal to or smaller than the cancellation predetermined value TLL. The automatic running control ECU 4 may perform control to change over the air pressure adjustment device 8 from the UP state to the DOWN state when the sum GT remains equal to or smaller than the cancellation predetermined value TLL for a predetermined time. Further, the automatic running control ECU 4 may perform control to change over the air pressure adjustment device 8 from the UP state to the DOWN state when the sum GT remains equal to or smaller than the cancellation predetermined value TLL for a predetermined time and the vehicle C has covered a certain distance.

Figure 10:
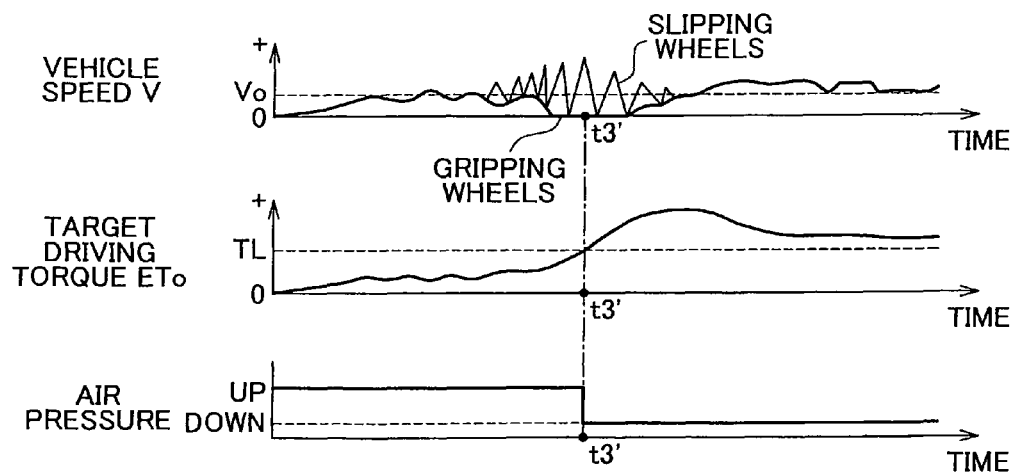
FIG. 10 is another diagram for explaining the operation of the vehicle running control apparatus according to the third embodiment of the invention.

Further, in the foregoing third embodiment of the invention, when it is determined that the sum GT has become larger than the predetermined value TL, namely, when it is determined that the vehicle C is running on a road difficult to run on, the air pressure adjustment device 8 is controlled to be changed over to the UP state. However, the invention is not limited to this configuration. FIG. 10 is another diagram for explaining the operation of the vehicle running control apparatus according to the third embodiment of the invention. The air pressure control portion 46 of the automatic running control ECU 4 may perform control to change over the air pressure adjustment device 8 to the UP state when it is determined that the sum GT is equal to or smaller than the predetermined value TL, and may perform control to change over the air pressure adjusting device 8 to the DOWN state when it is determined that the sum GT is larger than the predetermined value TL. That is, the air pressure of the tires (not shown) fitted to the vehicle C may be made lower when it is determined that the vehicle C is running on a road difficult to run on than when it is determined that the vehicle C is not running on a road difficult to run on.

In this case, as shown in FIG. 10, when it is determined that the vehicle C is not running on a road difficult to run on, the air pressure control portion 46 performs control to change over the air pressure adjustment device 8 to the UP state. Thus, the air pressure of the tires (not shown) is adjusted to be higher than in the case of the DOWN state. Further, when it is determined that the vehicle C is running on a road difficult to run on (as indicated by t3 in FIG. 10), the air pressure control portion 46 performs control to change over the air pressure adjustment device 8 to the DOWN state. Thus, the air pressure of the tires (not shown) is adjusted to be lower than in the case of the UP state. In the case where the vehicle C runs on, for example, a muddy road to which a traction is transmitted with difficulty, when the ground contact area of the tires is small, the respective wheels (not shown) tend to slip (spin). Accordingly, the respective wheels are divided into slipping wheels (as indicated by a thin line in FIG. 10) and gripping wheels (as indicated by a thick line in FIG. 10) through the transmission of a driving torque from the engine 100 to the respective wheels, and the vehicle speed V may decrease through an increase in the speed of the slipping wheels. In this case as well, the vehicle speed V of the vehicle C does not become equal to the target vehicle speed Vo. Therefore, an excessive load may be applied to the engine 100, the brake device 200, or the vehicle C Thus, when it is determined that the vehicle C is running on a road difficult to run on, the air pressure adjustment device 8 is controlled to be changed over to the DOWN state to reduce the air pressure of the tires and hence increase the ground contact area of the tires. In this manner, the capacity of the vehicle C to cover the whole distance on, for example, a muddy road with a road surface to which a traction cannot be transmitted when the ground contact area of the tires is small, can be enhanced. Thus, during automatic running control, an excessive load can be restrained from, being applied to the engine 100, the brake device 200, or the vehicle C due to the vehicle speed V that does not become equal to the target vehicle speed Vo as a result of a small ground contact area of the tires on a muddy road or the like.

Figure 11:
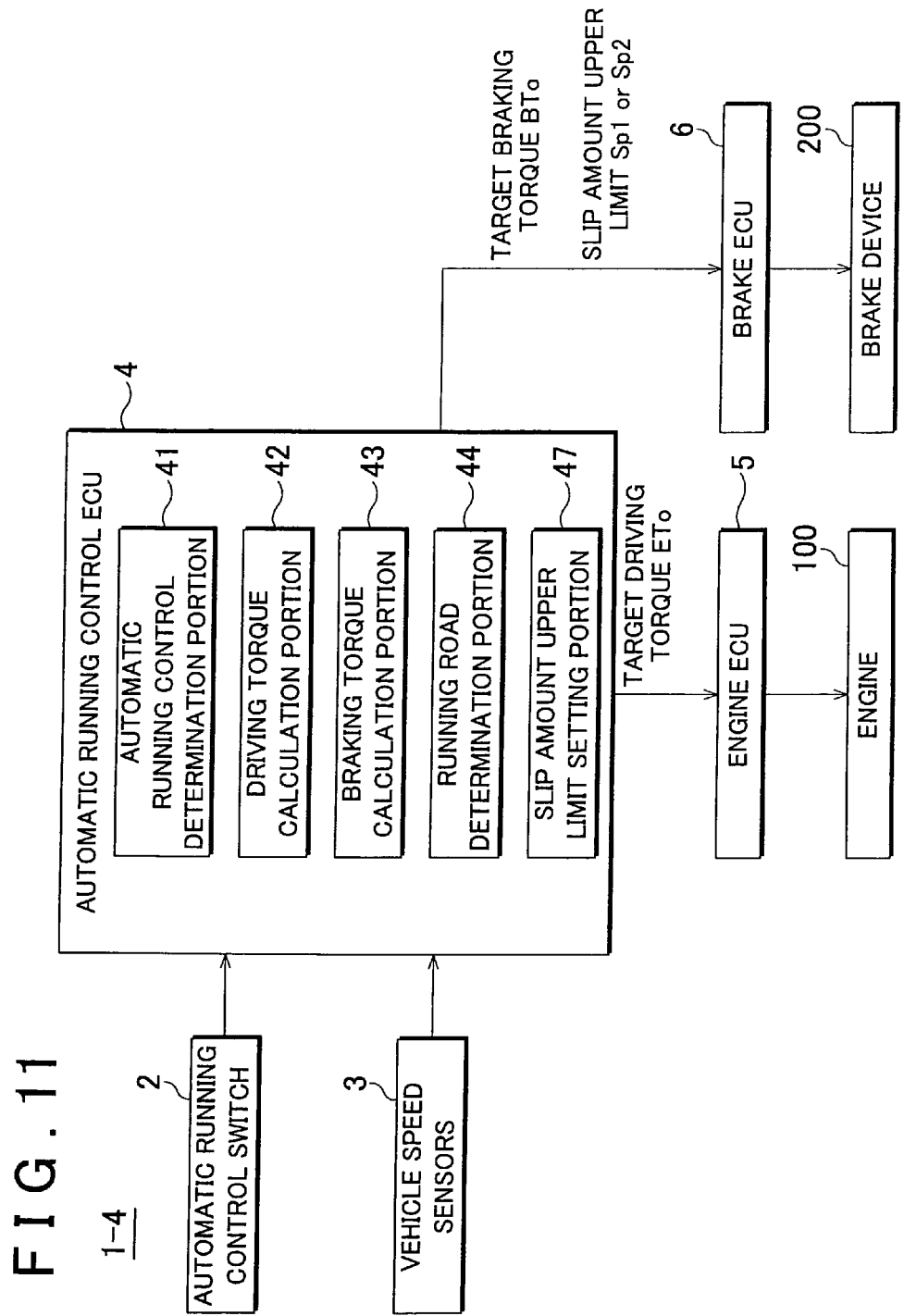
FIG. 11 is a diagram showing a configurational example of a vehicle running control apparatus according to the fourth embodiment of the invention.

Next, a vehicle running control apparatus according to the fourth embodiment of the invention will be described. FIG. 11 is a diagram showing a configurational example of the vehicle running control apparatus according to the fourth embodiment of the invention. A vehicle running control apparatus 1-4 according to the fourth embodiment of the invention is different from the vehicle running control apparatus 1-1 according to the first embodiment of the invention in that the brake device 200 adjusts the slip amount of the respective wheels (not shown) depending on whether or not the vehicle C is running on a road difficult to run on. It should be noted herein that that part of the vehicle running control apparatus 1-4 according to the fourth embodiment of the invention which is identical in basic configuration to the vehicle running control apparatus 1-1 according to the first embodiment of the invention as shown in FIG. 11 will not be described hereinafter.

The automatic running control ECU 4 has a slip amount upper limit setting portion 47. The slip amount upper limit setting portion 47 functions as a control changeover portion, and performs changeover control, namely, the control of changing over a slip amount Sp of the respective wheels (not shown) by means of the brake device 200 via the brake ECU 6. When the running road determination portion 44 determines that the vehicle C is running on a road difficult to run on, the slip amount upper limit setting portion 47 sets the slip amount upper limit to Sp2, which is smaller than Sp1, and performs control to change over the brake device 200 to a state where the slip amount Sp of the respective wheels is small.

The brake device 200 is a slip amount adjustment device, and is a control target that can be changed over. The brake device 200 adjusts the slip amount Sp of the respective wheels (not shown) of the vehicle C. In the fourth embodiment of the invention, the brake device 200 performs slip amount control to apply a target braking torque only to the slipping wheels, namely, the wheels that are slipping such that the slip amount Sp of the respective wheels does not become larger than the slip amount upper limit of the respective wheels set by the slip amount upper limit setting portion 47. Thus, the slip amount Sp of the slipping wheels is adjusted to be equal to or smaller than the slip amount upper limit. Accordingly, the brake device 200 can change over the slip amount of the slipping wheels in accordance with the slip amount upper limits Sp1 and Sp2 set by the slip amount upper limit setting portion 47. That is, the control of changing over the slip amount Sp of the respective wheels is performed by the slip amount upper limit setting portion 47. The slip amount Sp refers to a difference in speed between the slipping wheels and the gripping wheels when the respective wheels are divided into the slipping wheels (as indicated by thin lines in FIG. 13) and the gripping wheels (as indicated by thick lines in FIG. 13). Further, the slip amount upper limits Sp1 and Sp2 are for the speed of the gripping wheels. The speed of the slipping wheels for exceeding the slip amount upper limits Sp1 and Sp2 increases as the speed of the gripping wheels increases.

Figure 12:
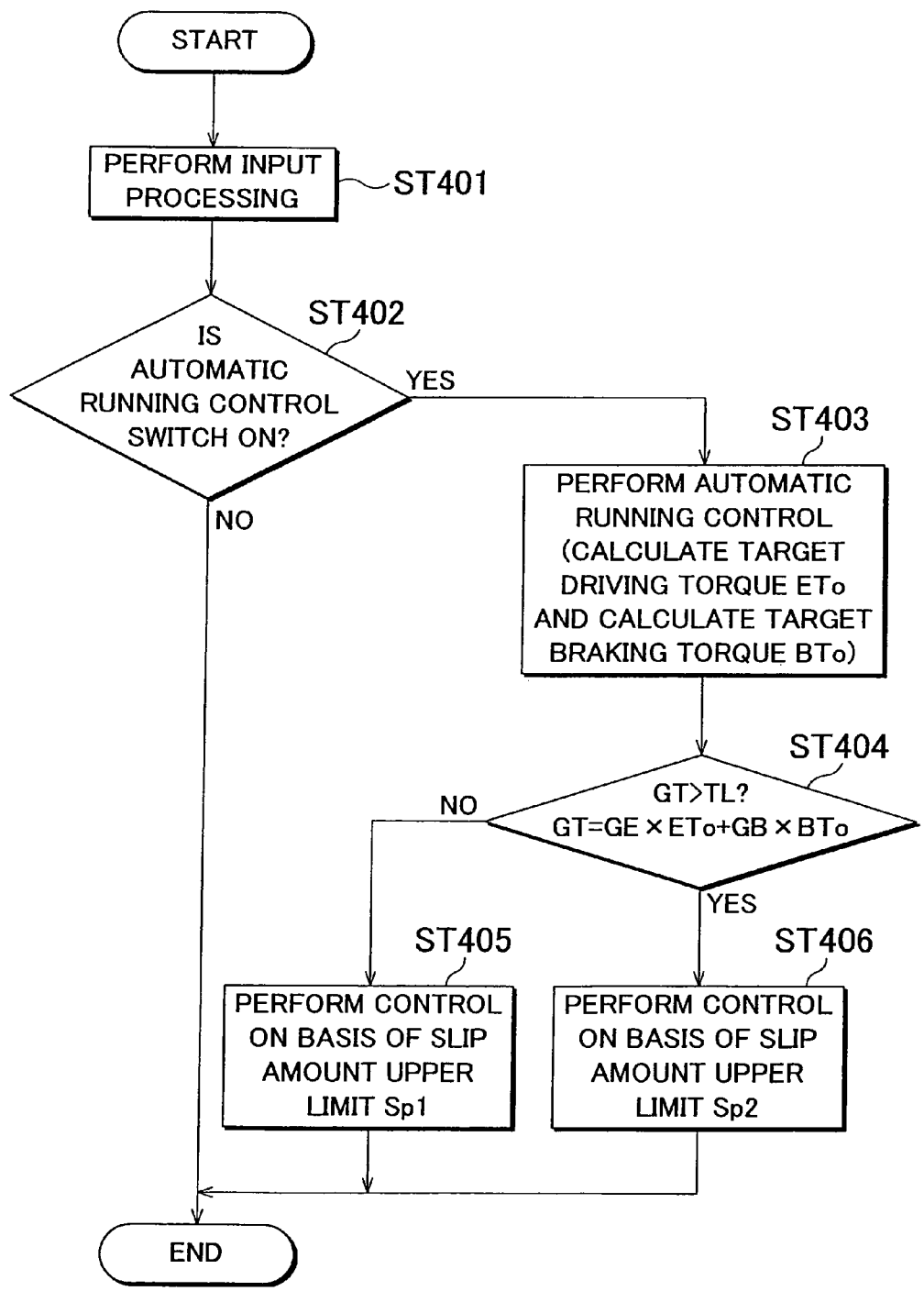
FIG. 12 is a diagram showing the flow of automatic running control performed by the vehicle running control apparatus according to the fourth embodiment of the invention.
Figure 13:
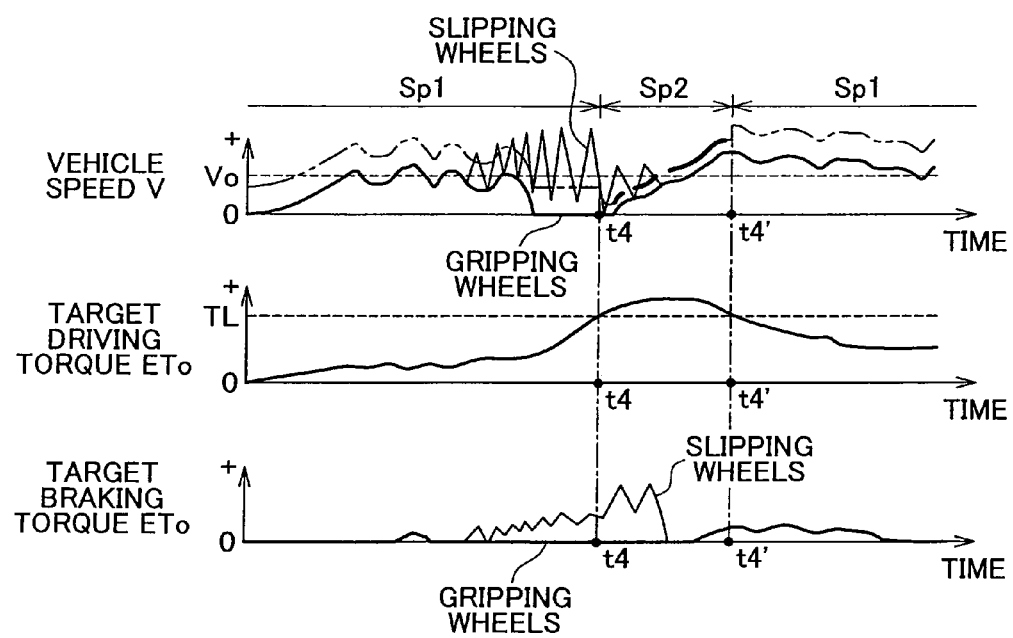
FIG. 13 is a diagram for explaining the operation of the vehicle running control apparatus according to the fourth embodiment of the invention.

Next, automatic running control performed using the vehicle running control apparatus 1-4 according to the fourth embodiment, of the invention will be described. FIG. 12 is a diagram showing the flow of automatic running control performed by the vehicle running control apparatus according to the fourth embodiment of the invention. FIG. 13 is a diagram for explaining the operation of the vehicle running control apparatus according to the fourth embodiment of the invention. Now, as for automatic running control performed using the vehicle running control apparatus 1-4, a method of performing control to change over the slip amount Sp of the respective wheels (not shown) of the vehicle C using a running road determination method will be described. Part of automatic running control performed using the vehicle running control apparatus 1-4 according to the fourth embodiment of the invention that is identical to automatic running control performed using the vehicle running control apparatus 1-1 according to the first embodiment of the invention will be described in a simplified manner. Further, the vehicle running control apparatus 1-4 performs vehicle running control on a control cycle thereof.

First of all, as shown in FIG. 12, the automatic running control ECU 4 performs an input processing (step ST401).

The automatic running control determination portion 41 of the automatic running control ECU 4 then determines whether or not the automatic running control switch 2 is ON (step ST402).

Then, when it is determined that the automatic running control switch 2 is ON (YES in step ST402), the automatic running control ECU 4 performs automatic running control (step ST403).

Then, since it is determined that the automatic running control switch 2 is ON (YES in step ST402), the automatic running control ECU 4 determines whether or not the sum GT (=GE×ETo+GB×BTo) is larger than the predetermined value TL (step ST404). In this step, the automatic running control ECU 4 determines, on the basis of the calculated target driving torque ETo and the calculated target braking torque BTo, whether or not the vehicle C is running on a road difficult to run on. For example, given that the weighted values GE and GB are equal to 1 and 0 respectively, the sum GT is simply equal to the target driving torque ETo, and the predetermined value TL is equal to the target driving torque ETo that is calculated by the automatic running control ECU 4 such that the vehicle speed V of the vehicle C becomes equal to the target vehicle speed Vo when the vehicle C is running on a road difficult to run on. Accordingly, as shown in FIG. 13, when the vehicle C runs on, for example, a road where the respective wheels (not shown) tend to slip, the respective wheels are divided into the slipping wheels (as indicated by the thin lines in FIG. 13) and the gripping wheels (as indicated by the thick lines in FIG. 13). In this case, the vehicle speed V decreases due to an increase in the slip amount Sp of the slipping wheels, and the target driving torque ETo increases to make the vehicle speed V of the vehicle C equal to the target vehicle speed Vo. Thus, the target driving torque ETo as the sum GT becomes larger than the predetermined value TL (as indicated by t4 in FIG. 13), and it is determined that the vehicle C is running on a road difficult to run on.

Then, as shown in FIG. 12, when it is determined that the sum GT is equal to or smaller than the predetermined value TL (NO in step ST404), the slip amount upper limit setting portion 47 of the automatic running control ECU 4 sets the slip amount upper limit to Sp1. The brake device 200 controls the slip amount Sp of the slipping wheels on the basis of the slip amount upper limit Sp1 (step ST405). In this step, as shown in FIG. 13, when it is determined that the vehicle C is not running on a road difficult to run on (as indicated by t4' in FIG. 13), the slip amount upper limit setting portion 47 sets the slip amount upper limit to Sp1 (as indicated by thin alternate long and two short dashes lines in FIG. 13), and performs control to change over the brake device 200 so as to perform slip amount control based on the slip amount upper limit Sp1. Thus, a maximum slip amount Spmax becomes larger than in the case where the slip amount of the slipping wheels is subjected to slip amount control on the basis of the slip amount upper limit Sp2. As a result, the slip amount increases.

Further, as shown in FIG. 12, when it is determined that the sum GT is larger than the predetermined value TL (YES in step ST404), the slip amount upper limit setting portion 47 of the automatic running control ECU 4 sets the slip amount upper limit to Sp2. The brake device 200 then controls the slip amount Sp of the slipping wheels on the basis of the slip amount upper limit Sp2 (step ST406). In this step, as shown in FIG. 13, when it is determined that the vehicle C is running on a road difficult to run on (as indicated by t4 in FIG. 13), the slip amount upper limit setting portion 47 sets the slip amount upper limit to Sp2 (as indicated by thick alternate long and two short dashes lines in FIG. 13), and performs control to change over the brake device 200 so as to perform slip amount control based on the slip amount upper limit Sp2. Thus, the maximum slip amount Spmax becomes smaller than in the case where the slip amount of the slipping wheels is subjected to slip amount control on the basis of the slip amount upper limit Sp1. As a result, the slip amount decreases.

As shown in FIG. 12, the automatic running control ECU 4 terminates a current control cycle and makes a transition to a subsequent control cycle when the brake device 200 is subjected to slip amount control on the basis of the slip amount upper limit Sp1, when the brake device 200 is subjected to slip amount control on the basis of the slip amount upper limit Sp2, and when it is determined that the automatic running control switch 2 is OFF (NO in step ST402).

As described above, in the vehicle running control apparatus 1-4 according to the fourth embodiment of the invention, as is the case with the foregoing first embodiment of the invention, it is determined, on the basis of the braking/driving torque applied to the vehicle C, whether or not the vehicle C is running on a road difficult to run on. Therefore, a determination can be reliably made on a road on which the vehicle C is running.

Further, in the vehicle running control, apparatus 1-4 according to the fourth embodiment of the invention, when it is determined that the vehicle C is running on a road difficult to run on, the slip amount Sp of the respective wheels (not shown) of the vehicle C is made smaller than in the case where it is determined that the vehicle C is not running on a road difficult to run on. Accordingly, a large portion of the driving torque generated by the engine 100 can be transmitted to the gripping wheels, namely, the wheels other than the slipping wheels by reducing the slip amount Sp of the respective wheels. Thus, the capacity of the vehicle C to cover the whole distance can be enhanced. Thus, during automatic running control, the vehicle C can be restrained from being stuck due to the slipping of any one of the respective wheels, and an excessive load can be restrained from being applied to the engine 100, the brake device 200, or the vehicle C due to the vehicle speed V that does not become equal to the target vehicle speed Vo.

In the foregoing fourth embodiment of the invention, when it is determined that the sum GT has become larger than the single predetermined value TL, the slip amount Sp of the respective wheels (not shown) is reduced. However, the invention is not limited to this configuration. The slip amount upper limit setting portion 47 can arbitrarily set the slip amount upper limit, and the vehicle running control apparatus 1-4 may have a plurality of predetermined values TL(1~n). In this case, it is appropriate that a plurality of levels for a road difficult to run on be set, and that the slip amount upper limit setting portion 47 reduce the slip amount upper limit to reduce the slip amount Sp by means of the brake device 200 every time the sum GT becomes larger than each of the predetermined values TL (1~n), namely, every time the level for a road difficult to run on increases. Further, it is appropriate to terminate automatic running control itself instead of reducing the slip amount upper limit when the level for a road difficult to run on is high, for example, when the sum GT is larger than TLn.

Further, in the foregoing fourth embodiment of the invention, after it is determined that the sum GT is larger than the predetermined value TL and the brake device 200 is subjected to slip amount control on the basis of the slip amount upper limit Sp2, slip amount control based on the slip amount upper limit Sp2 may be maintained until the sum GT becomes equal to or smaller than the cancellation predetermined value TLL. That is, a transition to slip amount control based on the slip amount upper limit Sp1 may be permitted when the sum GT becomes equal to or smaller than the cancellation predetermined value TLL. The automatic running control ECU 4 may change over the brake device 200 from slip amount control based on the slip amount upper limit Sp2 to slip amount control based on the slip amount upper limit Sp1 when the sum GT remains equal to or smaller than the cancellation predetermined value TLL for a predetermined time. Further, the automatic running control ECU 4 may change over the brake device 200 from slip amount control based on the slip amount upper limit Sp2 to slip amount control based on the slip amount upper limit Sp1 when the sum GT remains equal to or smaller than the cancellation predetermined value TLL for a predetermined time and the vehicle C has covered a certain distance.

Figure 14:
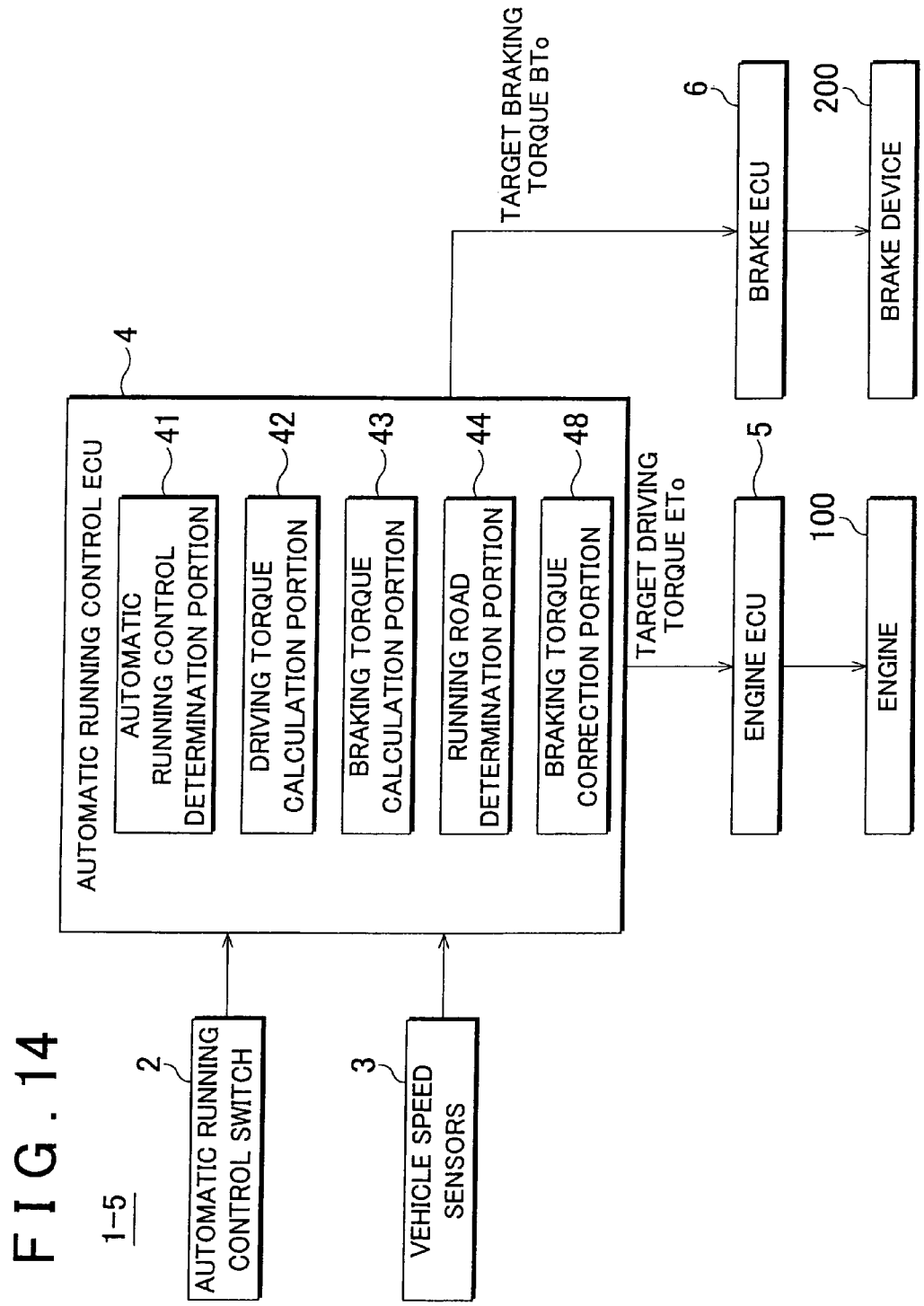
FIG. 14 is a diagram showing a configurational example of a vehicle running control apparatus according to the fifth embodiment of the invention.

Next, a vehicle running control apparatus according to the fifth embodiment of the invention will be described. FIG. 14 is a diagram showing a configurational example of the vehicle running control apparatus according to the fifth embodiment of the invention. A vehicle running control apparatus 1-5 according to the fifth embodiment of the invention is different from the vehicle running control apparatus 1-1 according to the first embodiment of the invention in that the brake device 200 adjusts the braking torque applied to the vehicle C depending on whether or not the vehicle C is running on a road difficult to run on. It should be noted herein that that part of the vehicle running control apparatus 1-5 according to the fifth embodiment of the invention which is identical in basic configuration to the vehicle running control apparatus 1-1 according to the first embodiment of the invention as shown in FIG. 14 will not be described hereinafter.

The automatic running control ECU 4 has a braking torque correction portion 48. The braking torque correction portion 48 functions as a control changeover portion, and performs changeover control, namely, the control of changing over the braking torque applied to the vehicle C by means of the brake device 200 via the brake ECU 6. When the running road determination portion 44 determines that the vehicle C is running on a road difficult to run on, the braking torque correction portion 48 corrects the target braking torque BTo in an increasing manner, and performs control to change over the brake device 200 to a state where the braking torque corrected in an increasing manner is generated. That is, when the running road determination portion 44 determines that the vehicle C is running on a road difficult to rim on, the brake ECU 6 controls the brake device 200 on the basis of the target braking torque BTo corrected in an increasing manner by the braking torque correction portion 48, and the brake device 200 generates a braking torque on the basis of the target braking torque BTo corrected in an increasing manner and applies the braking torque to the vehicle C.

Figure 15:
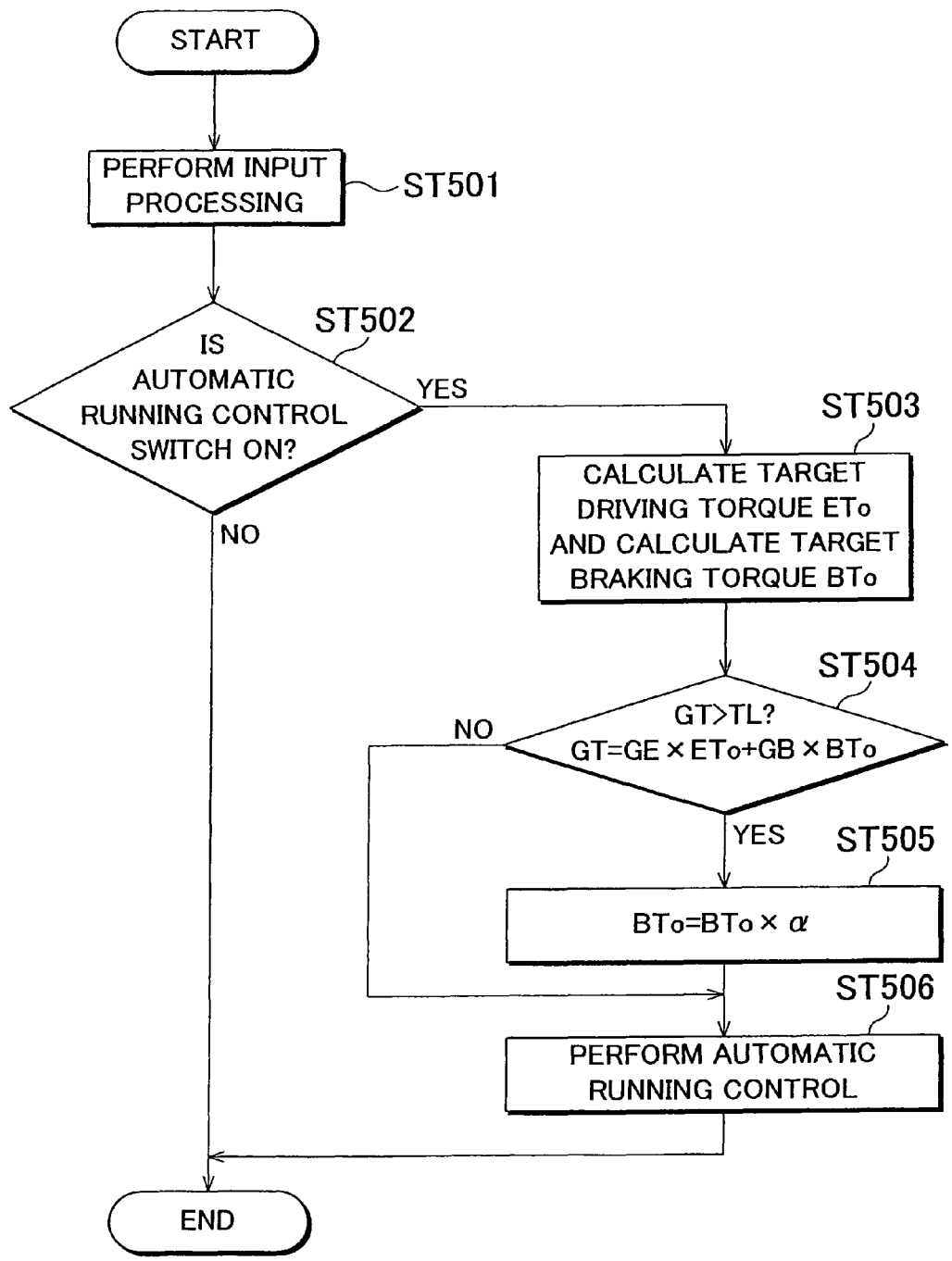
FIG. 15 is a diagram showing the flow of automatic running control performed by the vehicle running control apparatus according to the fifth embodiment of the invention.
Figure 16:
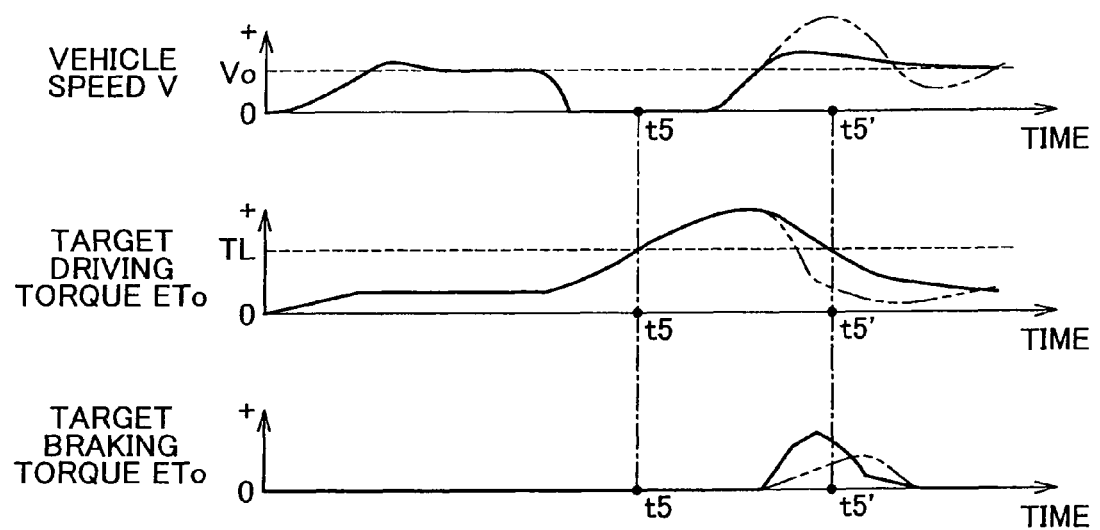
FIG. 16 is a diagram for explaining the operation of the vehicle running control apparatus according to the fifth embodiment of the invention.

Next, automatic running control performed using the vehicle running control apparatus 1-5 according to the fifth embodiment of the invention will be described. FIG. 15 is a diagram showing the flow of automatic running control performed by the vehicle running control apparatus according to the fifth embodiment of the invention. FIG. 16 is a diagram for explaining the operation of the vehicle running control apparatus according to the fifth embodiment of the invention. Now, as for automatic running control performed using the vehicle running control apparatus 1-5, a method of changing over the braking torque applied to the vehicle C using a running road determination method will be described. Part of automatic running control performed using the vehicle running control apparatus 1-5 according to the fifth embodiment of the invention that is identical to automatic running control performed using the vehicle running control apparatus 1-1 according to the first embodiment of the invention will be described in a simplified manner. Further, the vehicle running control apparatus 1-5 performs vehicle running control on a control cycle thereof.

First of all, as shown in FIG. 15, the automatic running control ECU 4 performs an input processing (step ST501).

The automatic running control determination portion 41 of the automatic running control ECU 4 then determines whether or not the automatic control switch 2 is ON (step ST502).

Then, when it is determined that the automatic running control switch 2 is ON (YES in step ST502), the automatic running control ECU 4 calculates the target driving torque ETo and the target braking torque BTo (step ST503).

Then, since it is determined that the automatic running control switch 2 is ON (YES in step ST502), the automatic running control ECU 4 determines whether or not the sum GT (=GE×ETo+GB×BTo) is larger than the predetermined value TL (step ST504). In this step, the automatic running control ECU 4 determines, on the basis of the calculated target driving torque ETo and the calculated target braking torque BTo, whether or not the vehicle C is running on a road difficult to run on. For example, given that the weighted values GE and GB are equal to 1 and 0 respectively, the sum GT is simply equal to the target driving torque ETo, and the predetermined value TL is equal to the target driving torque ETo that is calculated by the automatic running control ECU 4 such that the vehicle speed V of the vehicle C becomes equal to the target vehicle speed Vo when the vehicle C is running on a road difficult to run on. Accordingly, as shown in FIG. 16, on a road where, for example, there is an obstacle such as a rock, a step or the like, which is insurmountable unless a large driving torque is applied to the vehicle C, the vehicle speed V decreases due to the obstacle, and the target driving torque ETo increases to make the vehicle speed V of the vehicle C equal to the target vehicle speed Vo. Thus, the target driving torque ETo as the sum GT becomes larger than the predetermined value TL (indicated by t5 in FIG. 16), and it is determined that the vehicle C is running on a road difficult to run on.

Then, as shown in FIG. 15, when it is determined that the sum GT is larger than the predetermined value TL (YES in step ST504), the braking torque correction portion 48 of the automatic running control ECU 4 corrects the calculated target braking torque BTo in an increasing manner (step ST505). In this step, as shown in FIG. 16, when it is determined that the vehicle C is running on a road difficult to run on (as indicated by t5 in FIG. 16), the calculated target braking torque BTo is multiplied by a coefficient a to be corrected in an increasing manner (BTo=BTo×α).

As shown in FIG. 15, the automatic running control ECU 4 then performs automatic running control (step ST506). In this step, as shown in FIG. 16, when it is determined that the vehicle C is running on a road difficult to run on (as indicated by t5 in FIG. 16), the automatic running control ECU 4 outputs the target driving torque ETo calculated by the driving torque calculation portion 42 and the target braking torque BTo corrected in an increasing manner by the braking torque correction portion 48 to the engine ECU 5 and the brake ECU 6 respectively. Accordingly, the driving torque generated by the engine 100 and the braking torque generated by the brake device 200, which are controlled on the basis of the target driving torque ETo by the engine ECU 5 and on the basis of the target braking torque BTo corrected in an increasing manner by the brake ECU 6 respectively such that the vehicle speed V becomes equal to the target vehicle, speed Vo, are applied to the vehicle C, and automatic running control is performed. That is, the braking torque correction portion 48 changes over the brake device 200 to the control based on the target braking torque BTo corrected in an increasing manner. Thus, the braking torque applied to the vehicle C is made larger than in the case where the control is performed on the basis of the target braking torque BTo that is calculated when the vehicle C is not running on a road difficult to run on.

Further, as shown in FIG. 15, when it is determined that the sum GT is equal to or smaller than the predetermined value TL (NO in step ST504), the automatic running control ECU 4 performs automatic running control (step ST506). In this step, as shown in FIG. 16, when it is determined that the vehicle C is not running on a road difficult to run on (as indicated by t5' in FIG. 16), the automatic running control ECU 4 outputs the target driving torque ETo calculated by the driving torque calculation portion 42 and the target braking torque BTo calculated by the braking torque calculation portion 43 to the engine ECU 5 and the brake ECU 6 respectively. Accordingly, the driving torque generated by the engine 100 and the braking torque generated by the brake device 200, which are controlled on the basis of the target driving torque ETo by the engine ECU 5 and on the basis of the target braking torque BTo by the brake ECU 6 respectively such that the vehicle speed V becomes equal to the target vehicle speed Vo, are applied to the vehicle C, and automatic running control is performed.

As shown in FIG. 15, the automatic running control ECU 4 terminates a current control cycle and makes a transition to a subsequent control cycle when automatic running control is performed or when it is determined that the automatic running control switch 2 is OFF (NO in step ST502).

As described above, in the vehicle running control apparatus 1-5 according to the fifth embodiment of the invention, as is the case with the foregoing first embodiment of the invention, it is determined, on the basis of the braking/driving torque applied to the vehicle C, whether or not the vehicle C is running on a road difficult to run on. Therefore, a determination can be made reliably on a road on which the vehicle C is running.

Further, in the vehicle running control apparatus 1-5 according to the fifth embodiment of the invention, the braking torque applied to the vehicle C is made larger when it is determined that the vehicle C is running on a road difficult to run on than when it is determined that the vehicle C is not running on a road difficult to run on. Accordingly, the respective wheels can be restrained from slipping (spinning) and the capacity of the vehicle C to cover the whole distance can be enhanced by increasing the braking torque applied to the vehicle C Thus, during automatic running control, the vehicle C can be restrained from being, stuck due to the slipping of any one of the respective wheels, and an excessive load can be restrained from being applied to the engine 100, the brake device 200, or the vehicle C due to the vehicle speed V that does not become equal to the target vehicle speed Vo.

Further, when the driving torque applied to the vehicle C is increased on a road where, for example, there is an obstacle such as a rock, a step, or the like which is insurmountable unless a large driving torque is applied to the vehicle C, the vehicle C may dash out (run idly) due to the driving torque if the braking torque applied to the vehicle C is small after the vehicle C has surmounted the obstacle. However, in the vehicle running control apparatus 1-5 according to the fifth embodiment of the invention, when it is determined that the vehicle C is running On a road difficult to run on, the target braking torque BTo can be increased. Therefore, a large braking torque can be applied to the vehicle C after the vehicle C has surmounted the obstacle. Thus, the vehicle speed V can be made close to the target vehicle speed Vo in a shorter time (as indicated by a thick line in FIG. 16) than in the case where the target braking torque BTo is not corrected in an increasing manner (as indicated by alternate long and two short dashes lines in FIG. 16) even when it is determined that the vehicle C is running on a road difficult to run on. Thus, the vehicle C can be restrained from dashing out.

In the foregoing fifth embodiment of the invention, the target braking torque BTo is increased when it is determined that the sum GT has become larger than the single predetermined value TL. However, the invention is not limited to this configuration. The braking torque correction portion 48 can arbitrarily correct the target braking torque BTo in an increasing manner, and the vehicle running control apparatus 1-5 may have a plurality of predetermined values TL(1~n). In this case, it is appropriate that a plurality of levels for a road difficult to run on be set, and that the braking torque correction portion 48 increase the amount of increase by which the target braking torque BTo is corrected in an increasing manner every time the sum GT becomes larger than each of the predetermined values TL(1~n), namely, every time the level for a road difficult to run on increases, and thus increase the braking torque applied to the vehicle C by means of the brake device 200.

Further, in the foregoing fifth embodiment of the invention, after it is determined that the sum GT is larger than the predetermined value TL and the brake device 200 is controlled on the basis of the target braking torque BTo corrected in an increasing manner, the control of the brake device 200 based on the target braking torque BTo corrected in an increasing manner may be maintained until the sum GT becomes equal to or smaller than the cancellation predetermined value TLL. That is, when the sum GT becomes equal to or smaller than the cancellation predetermined value TLL, a transition to the control based on the target braking torque BTo calculated by the braking torque calculation portion 43 may be permitted. The automatic running control ECU 4 may change over the brake device 200 from the control based on the target braking torque BTo corrected in an increasing manner to the control based on the target braking torque BTo calculated by the braking torque calculation portion 43 when the sum GT remains equal to or smaller than the cancellation predetermined value TLL for a predetermined time. Further, the automatic running control ECU 4 may change over the brake device 200 from the control based on the target braking torque BTo corrected in an increasing manner to the control based on the target braking torque BTo calculated by the braking torque calculation portion 43 when the sum GT remains equal to or smaller than the cancellation predetermined value TLL for a predetermined time and the vehicle C has covered a certain distance.

The foregoing first to fifth embodiments of the invention may be realized in combination with one another.

In the vehicle running control apparatuses 1-1 to 1-5 according to the foregoing first to fifth embodiments of the invention, the sum GT includes the target driving torque ETo calculated such that the vehicle speed V of the vehicle C becomes equal to the target vehicle speed Vo. However, the invention is not limited to this, configuration. For example, it is appropriate to provide a G sensor for detecting a gradient 6 of a road surface on which the vehicle C is running, and include in the sum GT a value obtained by subtracting a target gradient termination driving torque capable of terminating the vehicle C from the target driving torque ETo at the gradient 6 detected by the G sensor, instead of the target driving torque ETo.

Further, in the vehicle running control apparatuses 1-1 to 1-5 according to the foregoing first to fifth embodiments of the invention, the automatic running control ECU 4 may determine that the vehicle C is running on a road difficult to run on when the sum GT remains larger than the predetermined value TL for a predetermined time.

Further, in the vehicle running control apparatuses 1-1 to 1-5 according to the foregoing first to fifth embodiments of the invention, the automatic running control ECU 4 calculates the target driving torque ETo or the target braking torque BTo, and determines, on the basis of the target driving torque ETo or the target braking torque BTo, whether or not the vehicle C is running on a road difficult to run on. However, the automatic running control ECU 4 may calculate a target driving force or a target braking force, and determine, on the basis of the target driving force or the target braking force, whether or not the vehicle C is running on a road difficult to run on.

Further, in the vehicle running control apparatuses 1-1 to 1-5 according to the foregoing first to fifth embodiments of the invention, it is appropriate to determine whether or not the vehicle C is running on a road difficult to run on only when the target vehicle speed Vo is equal to or lower than a predetermined target vehicle speed VoL (about 10 km/h) in the case where the target vehicle speed Vo can be arbitrarily set, for example, when the driver can arbitrarily set the target vehicle speed Vo. This is because the vehicle speed is low when the vehicle C runs off-road.

Further, in the foregoing second to fifth embodiments of the invention, the vehicle running control apparatuses 1-2 to 1-5 perform automatic running control to make a determination on a road, namely, determine whether or not the vehicle C is running on a road difficult to run on. However, the invention is not limited to this configuration. For example, it is appropriate to determine whether or not the vehicle C is running on a road difficult to run on even when automatic running control is not performed. In this case, it is appropriate to determine whether or not a running road determination condition is fulfilled depending on whether or not the vehicle speed V of the vehicle C is equal to or lower than the predetermined target vehicle speed VoL (e.g., about 10 km/h) by means of, for example, a control device mounted on the vehicle C, and adjust the vehicle-height of the vehicle, the air pressure of the tires (not shown), the slip amount of the respective wheels (not shown), and the braking torque as is the case with the foregoing second to fifth embodiments of the invention respectively when it is determined that the vehicle speed V of the vehicle C is equal to or lower than the predetermined target vehicle speed VoL (e.g. about 10 km/h). It is also appropriate to drive a buzzer provided in the compartment of the vehicle C and light a warning level lamp on a meter panel when it is determined that the vehicle speed V of the vehicle C is equal to or lower than the predetermined target vehicle speed VoL (e.g. about 10 km/h).

As described above, the vehicle running control apparatus according to the invention is useful for a running road determination device for determining whether or not a vehicle is running on a road difficult to run on and as a vehicle running control apparatus equipped with the running road determination device. In particular, the vehicle running control apparatus is suited to reliably make a determination on a road on which the vehicle is running.

What is claimed is:

1. A vehicle running control apparatus comprising:
at least one of a driving torque generating device that applies a driving torque to a vehicle and a braking torque generating device that applies a braking torque to the vehicle; and
a control device that calculates at least one of a target braking torque and a target driving torque such that a vehicle speed is controlled to become equal to a preset target vehicle speed, and controls the braking torque generating device or the driving torque generating device based on the calculated target braking torque or the calculated target driving torque;

a running road determination portion that:
  sets weighted values of the driving torque and the braking torque in accordance with a running situation of the vehicle.,
  sets a weighted driving torque by multiplying the driving torque by the weighted values of the driving torque,
  sets a weighted braking torque by multiplying the braking torque by the weighted values of the braking torque, and
  when the vehicle speed is controlled by the braking torque or the driving torque which the control device calculates, determines whether or not a road on which the vehicle is running is difficult to run on, on a basis of
  a sum of the weighted driving torque and the weighted braking torque.

2. The vehicle running control apparatus according to claim 1, wherein
  the vehicle running control apparatus performs an automatic running control by controlling the braking torque generating device or the driving torque generating device such that the vehicle speed of the vehicle becomes equal to the preset target vehicle speed, and terminates the automatic running control when the running road determination portion determines that the road on which the vehicle is running is difficult to run on.

3. The vehicle running control apparatus according to claim 2, further comprising:
  a condition determination portion that determines whether or not a running road determination condition is fulfilled, wherein
  the condition determination portion determines that the running road determination condition is fulfilled when the automatic running control is performed.

4. The vehicle running control apparatus according to claim 2, wherein
  the preset target vehicle speed is in a low speed range.

5. The vehicle running control apparatus according to claim 4, wherein
  the low speed range is around about 10 km/h.

6. The vehicle running control apparatus according to claim 1, wherein
  the vehicle running control apparatus performs an automatic running control by controlling the braking torque generating device or the driving torque generating device such that the vehicle speed of the vehicle becomes equal to the preset target vehicle speed, and is equipped with a control changeover portion that changes over a control target, which can be changed over, when the running road determination portion determines that the road on which the vehicle is running is difficult to run on.

7. The vehicle running control apparatus according to claim 6, wherein
  the control target is a vehicle height adjustment device that adjusts a vehicle height of the vehicle, and
  the control changeover portion makes the vehicle height higher when the running road determination portion determines that the road on which the vehicle is running is difficult to run on than when the running road determination portion determines that the road on which the vehicle is running is not difficult to run on.

8. The vehicle running control apparatus according to claim 6, wherein
  the control target is an air pressure adjustment device that adjusts an air pressure of tires fitted to the vehicle, and
  the control changeover portion changes the air pressure of the tires when the running road determination portion determines that the road on which the vehicle is running is difficult to run on, from a value of the air pressure of the tires at a time when the running road determination portion determines that the road on which the vehicle is running is not difficult to run on.

9. The vehicle running control apparatus according to claim 6, wherein
  the control changeover portion makes the air pressure of the tires higher when the running road determination portion determines that the road on which the vehicle is running is difficult to run on than when the running road determination portion determines that the road on which the vehicle is running is not difficult to run on.

10. The vehicle running control apparatus according to claim 6, wherein
  the control changeover portion makes the air pressure of the tires lower when the running road determination portion determines that the road on which the vehicle is running is difficult to run on than when the running road determination portion determines that the road on which the vehicle is running is not difficult to run on.

11. The vehicle running control apparatus according to claim 6, wherein
  the control target is a slip amount adjustment device that adjusts slip amounts of respective wheels of the vehicle, and
  the control changeover portion makes the slip amounts of the respective wheels smaller when the running road determination portion determines that the road on which the vehicle is running is difficult to run on than when the running road determination portion determines that the road on which the vehicle is running is not difficult to run on.

12. The vehicle running control apparatus according to claim 6, wherein the control target is the braking torque generating device that applies the braking torque to the vehicle, and
  the control changeover portion makes the braking torque larger when the running road determination portion determines that the road on which the vehicle is running is difficult to run on than when the running road determination portion determines that the road on which the vehicle is running is not difficult to run on.

13. The vehicle running control apparatus according to claim 6, wherein
  the preset target vehicle speed is in a low speed range.

14. The vehicle running control apparatus according to claim 1, wherein
  the running road determination portion sets weighted values for the target driving torque and the target braking torque, and
  determines, through a comparison of a sum of the weighted target driving torque and the weighted target braking torque with a predetermined value, whether the road on which the vehicle is running is difficult to run on.

15. A vehicle running control method comprising:
  performing an automatic running control such that a vehicle speed of a vehicle becomes equal to a preset target speed, by applying at least one of a driving torque and a braking torque to the vehicle;
  setting weighted values of the driving torque and the braking torque in accordance with a running situation of the vehicle;

setting a weighted driving torque by multiplying the driving torque by the weighted values of the driving torque:
setting a weighted braking torque by multiplying the braking torque by the weighted values of the braking torque;
determining whether or not a road on which the vehicle is running is difficult to run on, on a basis of a sum of the weighted driving torque and the weighted braking torque, when the automatic running control is performed.

16. The vehicle running control method according to claim 15, wherein
the automatic running control is terminated when it is determined that the road on which the vehicle is running is difficult to run on.

17. The vehicle running control method according to claim 15, further comprising
changing over a control target, which can be changed over, when it is determined that the road on which the vehicle is running is difficult to run on.

* * * * *